(12) United States Patent
Heikes et al.

(10) Patent No.: US 7,779,076 B2
(45) Date of Patent: Aug. 17, 2010

(54) INSTANT MESSAGING PERSONALIZATION

(75) Inventors: Brian Heikes, Ashburn, VA (US); James A. Odell, Potomac Falls, VA (US); Justin Uberti, Sterling, VA (US); Andrew L. Wick, McLean, VA (US); Xiaoyan Yin, Fairfax Station, VA (US); Xiaopeng Zhang, Oak Hill, VA (US)

(73) Assignee: AOL Inc., Dulles, VA (US)

( * ) Notice: Subject to any disclaimer, the term of this patent is extended or adjusted under 35 U.S.C. 154(b) by 825 days.

(21) Appl. No.: 10/305,015

(22) Filed: Nov. 27, 2002

(65) Prior Publication Data
US 2003/0225846 A1   Dec. 4, 2003

Related U.S. Application Data

(60) Provisional application No. 60/384,147, filed on May 31, 2002, provisional application No. 60/416,902, filed on Oct. 9, 2002.

(51) Int. Cl.
*G06F 15/16* (2006.01)
*G06F 12/00* (2006.01)

(52) U.S. Cl. ....................... 709/206; 709/207

(58) Field of Classification Search ............... 709/204, 709/205, 206, 207, 217–218, 219, 225–229, 709/250; 345/753, 754, 755, 756, 757, 758, 345/759; 715/758
See application file for complete search history.

(56) References Cited

U.S. PATENT DOCUMENTS

| | | | |
|---|---|---|---|
| 5,388,202 A * | 2/1995 | Squires et al. | 715/800 |
| 5,657,462 A * | 8/1997 | Brouwer et al. | 715/709 |
| 5,659,692 A | 8/1997 | Poggio et al. | |
| 5,675,752 A * | 10/1997 | Scott et al. | 715/866 |
| 5,745,556 A | 4/1998 | Ronen | |
| 5,793,365 A * | 8/1998 | Tang et al. | 715/758 |
| 5,872,521 A | 2/1999 | Lopatukin et al. | |
| 5,880,731 A * | 3/1999 | Liles et al. | 345/349 |
| 5,894,305 A * | 4/1999 | Needham | 345/329 |

(Continued)

FOREIGN PATENT DOCUMENTS

EP   1011248   6/2000

(Continued)

OTHER PUBLICATIONS

Collaborative Virtual Environments, Designing a Non-Verbal Language for Expressive Avatars, Salem, B. & Earle, N. from the Univ. of Plymouth, 2000, ISBN:1-58113-303-0, p. 93-101.*

(Continued)

*Primary Examiner*—Zarni Maung
(74) *Attorney, Agent, or Firm*—Finnegan, Henderson, Farabow, Garrett & Dunner, LLP

(57) ABSTRACT

Perception of a personalization item is enabled in an instant messaging communications session by rendering, on an instant message recipient system, an instant messaging application user interface for an instant messaging communications session involving at least an instant message recipient and an instant message sender. An identifier that enables identification of a personalization item of an individual instant message user is obtained, and the identifier is associated with the personalization item. The personalization item is obtained independently of the message used to obtain the identifier, and the personalization item is rendered at the instant message recipient system.

72 Claims, 18 Drawing Sheets

U.S. PATENT DOCUMENTS

| | | | | |
|---|---|---|---|---|
| 5,944,780 | A | * | 8/1999 | Chase et al. ............... 709/201 |
| 5,963,217 | A | * | 10/1999 | Grayson et al. ............ 345/473 |
| 6,128,618 | A | | 10/2000 | Eliovson |
| 6,192,396 | B1 | | 2/2001 | Kohler |
| 6,205,432 | B1 | | 3/2001 | Gabbard |
| 6,219,045 | B1 | * | 4/2001 | Leahy et al. ................ 715/757 |
| 6,248,946 | B1 | | 6/2001 | Dwek |
| 6,252,952 | B1 | | 6/2001 | Kung et al. |
| 6,301,609 | B1 | | 10/2001 | Aravamudan et al. |
| 6,324,569 | B1 | | 11/2001 | Ogilvie et al. |
| 6,346,952 | B1 | | 2/2002 | Shtivelman |
| 6,373,817 | B1 | | 4/2002 | Kung et al. |
| 6,389,028 | B1 | | 5/2002 | Bondarenko et al. |
| 6,430,604 | B1 | | 8/2002 | Ogle et al. |
| 6,434,599 | B1 | | 8/2002 | Porter |
| 6,453,294 | B1 | | 9/2002 | Dutta et al. |
| 6,633,850 | B1 | | 10/2003 | Gabbard |
| 6,772,195 | B1 | * | 8/2004 | Hatlelid et al. ............. 709/204 |
| 6,876,728 | B2 | | 4/2005 | Kredo et al. |
| 6,961,755 | B2 | | 11/2005 | Matsuda |
| 7,035,803 | B1 | | 4/2006 | Ostermann et al. |
| 7,043,530 | B2 | | 5/2006 | Isaacs et al. |
| 7,133,900 | B1 | | 11/2006 | Szeto |
| 7,145,678 | B2 | | 12/2006 | Simpson |
| 7,194,542 | B2 | | 3/2007 | Segan et al. |
| 2001/0030664 | A1 | | 10/2001 | Shulman et al. |
| 2001/0054084 | A1 | | 12/2001 | Kosmynin |
| 2002/0002542 | A1 | | 1/2002 | Ando |
| 2002/0059425 | A1 | | 5/2002 | Belfiore et al. |
| 2002/0075303 | A1 | * | 6/2002 | Thompson et al. .......... 345/751 |
| 2002/0078153 | A1 | | 6/2002 | Chung et al. |
| 2002/0113820 | A1 | | 8/2002 | Robinson et al. |
| 2002/0119789 | A1 | | 8/2002 | Friedman |
| 2002/0138286 | A1 | | 9/2002 | Engstrom |
| 2002/0174026 | A1 | | 11/2002 | Pickover et al. |
| 2002/0178206 | A1 | | 11/2002 | Smith |
| 2002/0184309 | A1 | | 12/2002 | Danker et al. |
| 2003/0088789 | A1 | | 5/2003 | Fenton et al. |
| 2003/0140103 | A1 | | 7/2003 | Szeto et al. |
| 2003/0182375 | A1 | | 9/2003 | Zhu et al. |
| 2003/0210265 | A1 | | 11/2003 | Haimberg |
| 2004/0205480 | A1 | | 10/2004 | Moore |

FOREIGN PATENT DOCUMENTS

| | | |
|---|---|---|
| JP | 411355619 | 12/1999 |

OTHER PUBLICATIONS

Instant Messaging With Mobile Phones to Support Awareness, Mitsuoka, M., et. al. IEEE ISBN 0-7695-0942-8/01, p. 223-230.*
Optimizing Linuz's User Interface, Jeff Arnholt, Linux Journal, Issue 19, Specialized Sys. Consultants, Inc., 1995, p. 1-6.*
David Kurlander et al., "International Conference on Computer Graphics and Interactive Techniques—Proceedings of the 23rd annual conference on Computer graphics and interactie techniques," Comic Chat, printed from http://portal.acm.org/citation.cfm?id=237260&coll=portal&d1=portal&CFID=3718856&CF... on Aug. 9, 2002, pp. 225-236.
Cerulean Studios, Trillian Help Center, Chapter 4, Section 1, printed from http://www.trillian.cc/help/sec-1.php?hchap=4&hsub=1 on Nov. 12, 2002, pp. 1-2.
Cerulean Studios, Trillian Help Center, Tutorials, Chapter 10, Section 5, printed from http://www.trillian.cc/help/sec-1.php?hchap=10&hsub=5 on Nov. 12, 2002, p. 1.
Cerulean Studios, Trillian Help Center, Tutorials, Chapter 10, Section 7, printed from http://www.trillian.cc/help/sec-1.php?hchap=10&hsub=7 on Nov. 12, 2002, pp. 1-2.
Pamela Parker, "Oct. 22, 2001—New Yahoo! Messenger Incorporates Viral Marketing", printed from http://siliconvalley.internet.com/news/article.php/908221 on Oct. 30, 2002, pp. 1-3.
InternetNews.com Staff, Apr. 17, 2002—IAR Bits and Bytes, "Yahoo! Debuts Purina IM Skin, Eagles Tour Promo," printed from http://www.intrnetnews.com/IAR/article.php/1011751 on Oct. 30, 2002, pp. 1-3.
Yahoo! Messenger, Yahoo! Help—IMVironments, printed from http://help.yahoo.com/help/us/mesg/imv/index.html on Oct. 30, 2002, p. 1.
Yahoo! Messenger, Yahoo! Help—IMVironments, printed from http://help.yahoo.com/help/us/mesg/imv/imv-04.html on Oct. 30, 2002, p. 1.
Yahoo! Messenger, Yahoo! Help—IMVironments, printed from http://help.yahoo.com/help/us/mesg/imv/imv-01.html on Oct. 30, 2002, p. 1.
Making your own Yahoo! Messenger IMVironments, printed from http://www.xcflabs.com/~yaroslav/imvironments/instructions.html on Oct. 30, 2002, pp. 1-2.
Bob Woods, Instant Messaging Planet: Public IM: IM—The Cat's Meow, printed from http://www.instantmessagingplanet.com/public/article/0,,10817_1011011,00.html. on Oct. 30, 2002, pp. 1-3.
Roy Santos, Tech TV/Review: Yahoo! Messenger 5.0, printed from http://www.techtv.com/products/print/0,23102,3351041,00.html on Oct. 30, 2002, pp. 1-2.
Rebecca Viksnins, First Look: Yahoo Messenger 5.0—Software Reviews—CNET.com, printed from http://www.cnet.com/software/0-5566362-8-7787365-1.html on Oct. 30, 2002, pp. 1-2.
ZDNet: Yahoo Messenger 5.0 Review, printed from http://www.zdnet.com/supercenter/stories/review/0,12070,538313,00.html on Oct. 30, 2002, pp. 1-3.
ZDNet: Yahoo Messenger 5.0 Overview, printed from http://www.zdnet.com/supercenter/stories/overview/0,12069,538313,00.html on Oct. 30, 2002, pp. 1-3.
Screenshot demonstration of Yahoo Messenger—IMVironments, Nov. 12, 2002, p. 1.
Screenshot Menu, Yahoo! Messenger Preferences, Nov. 12, 2002, p. 1.
Screenshoot demonstration, karl_renner2002—Instant Message, Nov. 12, 2002, p. 1.
Yahoo: Messenger—IMVironments™, printed from http://messenger.yahoo.com/messenger/imv/index.html on Nov. 12, 2002, pp. 1-2.
Yahoo! Help—IMVironments, "How do I send an IMVironment to a friend?", printed from http://help.yahoo.com/help/us/mesg/imv/imv-04.html on Nov. 12, 2002, p. 1.
Yahoo!Messenger, Instantly communicate with all of your online friends . . . , printed from http://messenger.yahoo.com/ on May 24, 2002, p. 1.
Yahoo!Messenger—IMVironments™, List of Available IMVironments, printed from http://messenger.yahoo.com/messenger/imv/ on May 24, 2002, pp. 1-2.
Screenshot, nikebball87: AIM—nikebball87, printed from http://www.trillian.cc/skins/windowsxp.gif on May 14, 2002, p. 1.
Screenshot, Trillian 7 Skin: GoneBlue v.01, printed from http://www.trillian.cc/skins/goneblue.jpg on May 14, 2002, p. 1.
Screenshot, Dream Green, printed from http://www.trillian.cc/skins/DreamGreen.jpg on May 14, 2002, p. 1.
Screenshot, Trillian chosenOS, printed from http://www.trillian.cc/skins/chosen_trill.jpg on May 14, 2002, p. 1.
Screenshot demonstration, Yahoo Messenger, sboalick—Instant Message, May 14, 2002, p. 1.
Netscape 7.0, Preview Release 1, Reviewer's Guide, May 17, 2002, chapter 2, "Internet Messaging," pp. 9-10 and "Instant Messaging with AIM (AOL Instant Messenger$^{SM}$)," pp. 16-18.
iPlanet Instant Messenger Release 3.0 Quick Reference, Oct. 2001, pp. 1-5.

* cited by examiner

INSTANT MESSAGING PERSONALIZATION

This application claims priority from U.S. Provisional Application No. 60/384,147, filed May 31, 2002, and U.S. Provisional Application No. 60/416,902, filed Oct. 9, 2002, both of which are incorporated by reference.

TECHNICAL FIELD

This description relates to instant messaging communications and more particularly to personalization of instant messaging communications.

BACKGROUND

Online service providers facilitate access to information and services by providing interactive User Interfaces (UIs) that help users navigate to desired resources. For example, in the case of a system for communicating using instant messages (IMs), a UI allows an IM sender to invoke actions, such as establishing a communications link, through the selection of screen objects such as icons, windows, and drop-down menus. The design of a UI has a significant impact on an IM sender's online experience. In particular, the icons, the windows, and the menus of a UI may be arranged to enable an IM sender to locate information and services quickly and easily.

SUMMARY

In one general aspect, perception of a personalization item is enabled in an instant messaging communications session by rendering, on an instant message recipient system, an instant messaging application user interface for an instant messaging communications session involving at least an instant message recipient and an instant message sender. An identifier is obtained that enables identification of a personalization item of an individual instant message user, and the identifier is associated with the personalization item. The personalization item is obtained independently of the message used to obtain the identifier, and the personalization item is rendered at the instant message recipient system.

Implementations may include one or more of the following features. For example, the individual instant message user may be the instant message sender or the instant message recipient. The identifier may be obtained by receiving the identifier in an instant message from the instant message sender system. One or more identifiers associated with one or more personalization items for one or more instant message users at an instant message host system may be stored, the identity of the individual instant message user may be received at the instant message host system, an identifier associated with the individual instant message user may be accessed, and the associated identifier in a message may be sent from the instant message host system.

The identifier may be obtained, for example, by locating the identifier at the instant message recipient system or by retrieving the identifier from a remote data store. The location of the personalization item also may be obtained.

In one implementation, the identifier is obtained by receiving the identifier included with an instant message. In another implementation, the identifier is obtained by receiving the identifier upon a change in the presence state of the individual instant message user.

In one implementation, the personalization item may be provided by a third party, and may be enabled to be rendered in consideration of a payment. In another implementation, the personalization item may be configured to expire upon the occurrence of a predetermined event such as, for example, the passage of a predetermined length of time, the passage of a predetermined date, or a predetermined number of uses. In other implementations, a determination is made whether the personalization item has been banned or has expired, and if so, display of an expired personalization item may be disallowed.

The personalization item may be obtained by determining whether the personalization item associated with the received identifier is available at the instant message recipient system, retrieving the personalization item from the instant message recipient system if the personalization item is available at the instant message recipient system, and requesting the personalization item from a remote source and receiving the personalization item from the remote source at the instant message recipient system if the personalization item is not available at the instant message recipient system.

In one implementation, the personalization item may be requested by identifying the remote source. In another implementation, the personalization item is requested from an instant messaging host. In another implementation, the personalization item is requested from an instant message sender system. In yet another implementation, the personalization item is requested from a third-party server, For example, the personalization item may be requested from a server authorized as a partner to an instant messaging host.

The personalization item includes a graphic, such as an icon, a sound, a wallpaper capable of being rendered on an instant messaging application user interface, an animation sequence, a video segment, or a customized binary object provided by the instant message sender. The personalization item may also include a customized binary object that is uploaded by the instant message sender to a server.

In one implementation, the identifier includes an item type, a data size, and one or more flags such as, for example, a custom item flag, an official item flag, a banned item flag, and a redirect to different item flag.

The personalization item may be updated. Also, the actual format of the personalization item may be compared to an expected format of the personalization item based upon the identifier.

In another general aspect, a user interface on a display enables perception of communications that leverage an instant messaging platform. The user interface includes a module for rendering an instant messaging application user interface for an instant messaging communications session involving at least an instant message sender and an instant message recipient. The user interface is presented at the system display of the instant message recipient, and also includes a module for receiving a personalization item presented to the system display. The personalization item is associated with an individual instant message user and corresponds to an identifier obtained by the instant message recipient system. The identifier enables identification of a personalization item of the individual instant message user. The user interface also includes a module for rendering the personalization item independently of the message used to obtain the identifier.

Implementations may include one or more of the following features. For example, the individual instant message user includes the instant message sender and the instant message recipient.

In one implementation, the personalization item is rendered upon the occurrence of a change in the presence state of the individual instant message user. In another implementation, the identifier is obtained by receiving the identifier from an instant message sender system in an instant message.

In one implementation, the identifier is obtaining from the instant message host system. The instant message host system stores one or more identifiers associated with one or more personalization items for one or more instant message users, the instant message host system receives the identity of the individual instant message user, and accesses an identifier associated with the individual instant message user.

In another implementation, the identifier is retrieved from the instant message recipient system. In another implementation, the identifier is retrieved from a remote data store.

The personalization item may include any of the items noted above. The personalization item may be provided by a third party, and may be enabled to be rendered in consideration of a payment. The personalization item also may be configured to expire upon the occurrence of a predetermined event such as, for example, the passage of a predetermined length of time, the passage of a predetermined date, or a predetermined number of uses.

Aspects of the IM personalization may be implemented by an apparatus and/or by a computer program stored on a computer readable medium. The computer readable medium may comprise a disc, a client device, a host device, and/or a propagated signal. In addition, aspects of the IM personalization may be implemented in a client/host context or in a standalone or offline client device. The IM personalization items may be rendered in a client/host context and may be accessed or updated through a remote device in a client/host environment. The IM personalization items also may be rendered by the standalone/offline device and may be accessed or updated through a remote device in a non-client/host environment such as, for example, a LAN server serving an end user or a mainframe serving a terminal device.

Other features will be apparent from the following description, including the drawings, and from the claims.

DESCRIPTION OF DRAWINGS

Like reference symbols in the various drawings indicate like elements.

DETAILED DESCRIPTION

Figure 1:
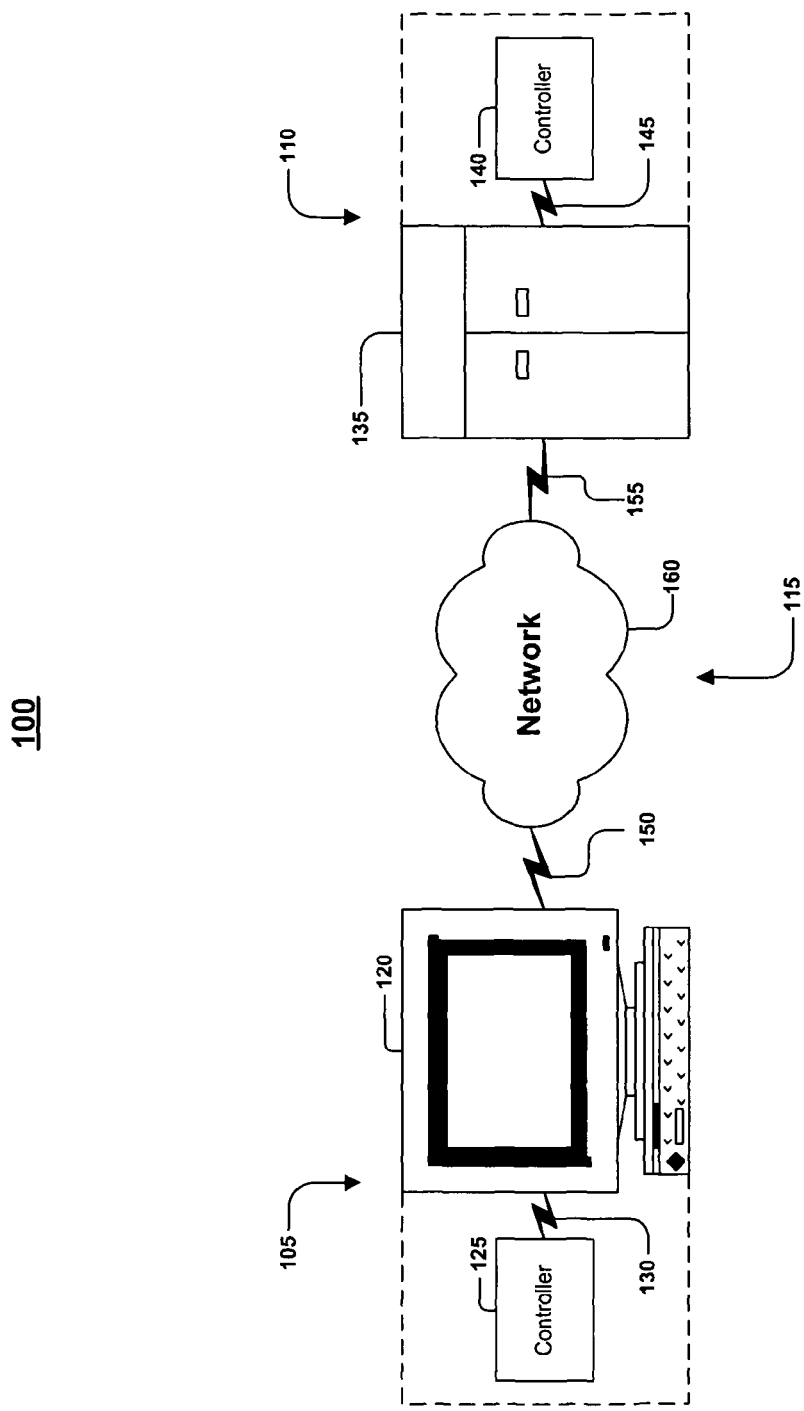
FIGS. 1-4 are block diagrams of an exemplary communications system.

An IM sender may have personalization items that may be sent or otherwise made perceivable to an IM recipient. Personalization items may represent a user or a characteristic of a user, and may include user-selectable binary objects. For example, personalization items include images such as wallpaper that is rendered in a location having a contextual placement on a user interface. The contextual placement typically indicates an association with the user represented by the wallpaper. For example, the wallpaper may be rendered in an area where messages from a particular user represented by the wallpaper are sent or received. In one implementation, wallpaper is a chrome (i.e., border) around a dialog area on a user interface. Personalization items also include icons such as buddy icons and mini-buddy icons, sounds, animation, video clips, and emoticons (e.g., smileys).

One or more personalization items may be rendered at the IM sender system and/or at the IM recipient system. IM sender personalization items are made available to the IM recipient system by sending one or more identifiers corresponding to the personalization items to the IM recipient. An identifier may be associated with a single personalization item, or with a group of two or more personalization items. The IM recipient system uses the identifier to identify the personalization item associated with the sender, and to locate perceivable content corresponding to the identifier. For instance, an identifier received from a sender may be used as a basis for determining if the corresponding personalization item is available locally at the IM recipient system, and, if so, the identifier may be used to retrieve the corresponding personalization item. If the personalization item is not available locally at the IM recipient system, the IM recipient system may use the identifier as a basis for generating one or more requests for the personalization item from another location, such as an IM host system or another remotely-accessible data store such as the IM sender system, or a remote or third-party server (e.g., a server accessible through the Internet).

In another implementation, the instant message from the IM sender does not contain an identifier, and the IM recipient system retrieves one or more identifiers associated with the personalization items of the IM sender. For example, the IM recipient system may retrieve the identifiers from a remote location such as an IM host system or another remotely-accessible data store such as those noted above. The identifiers may be stored at the remote location and associated with a screen name or other user identity. The IM recipient system may send a screen name or other user identity to the remote location. The remote location associates the screen name or other user identity with the corresponding identifiers, and sends those identifiers to the IM recipient system. For instance, the IM host may store identifiers associated with the screen name of an IM sender. The IM recipient system passes the screen name of the IM sender to the IM host, and the IM host returns the identifiers associated with that screen name to the IM recipient system. In another implementation, the IM host system or other remotely accessible data store may retrieve and send the personalization items themselves rather than the identifiers.

In another example in which the instant message from the IM sender does not contain an identifier, the IM recipient system may locally store the identifiers in association with a screen name or other user identity. The IM recipient system may then retrieve the locally-stored identifiers based on the screen name or other user identity of the IM sender. In another implementation, the IM recipient system may retrieve the personalization items themselves rather than the identifiers.

The identifiers may be retrieved before, during, or after receipt of an instant message from the IM sender. The identifiers may be stored at the IM recipient system, or at another location such as an IM host system or another remotely-accessible data store such as those noted above. Alternatively, the personalization item itself may be sent by the IM sender system to the IM recipient system, with a message or through a separate negotiation or communication, and also may be stored locally on the IM recipient system. Upon locating or receiving the personalization item, the IM recipient system renders the item for perception by the IM recipient.

In yet another implementation, IM recipient personalization items for a destination may be made available to the IM sender system by selecting one or more identifiers corresponding to the one or more personalization items of the IM recipient. The personalization items may be selected manually by the IM recipient or may be automatically selected for the IM recipient. The identifiers may be associated with a screen name or other identifying information of the IM recipient. For example, the identifiers associated with the screen name of a potential IM recipient may be stored locally at the IM sender system, or the IM sender system may retrieve such identifiers from a remotely-accessible data store such as the IM host system, the IM recipient system, or those noted above. The IM sender system uses the identifier to determine if the corresponding personalization item is available locally at the IM sender system, and, if so, the IM sender system retrieves the corresponding personalization item. If the personalization item is not available locally at the IM sender system, the IM sender system requests the personalization item from a remotely-accessible data store, as described above. Alternatively, the personalization item itself may be associated with the IM recipient and retrieved by the IM sender system. Once the IM sender system locates or receives the one or more personalization items associated with a destination recipient, the IM sender system renders the one or more personalization item(s) for perception by the IM sender. Thus, the personalization items of the IM recipient may be rendered to the IM sender before correspondence is initiated or communications are established by the recipient and without previously having received an IM message from the IM recipient.

In another implementation, IM sender personalization items may be made available to the IM sender system and rendered at the IM sender system by selecting the identifiers corresponding to the personalization items of the IM sender. The personalization items may be selected manually by the IM sender or may be automatically selected for the IM sender. The identifiers may be associated with a screen name or other identifying information of the IM sender. For example, the identifiers may be associated with the screen name of the IM sender and stored locally at the IM sender system, or the IM sender system may retrieve the identifiers associated with the screen name of the IM sender from another location such as the IM host system or another remotely-accessible data store such as those noted above. The IM sender system uses the identifier to determine if the corresponding personalization item is available locally at the IM sender system, and if so, the IM sender system retrieves the corresponding personalization item. If the personalization item is not available locally at the IM sender system, the IM sender system requests the personalization item from a remotely-accessible data store, as described above. Alternatively, the personalization item itself may be associated with the IM sender and retrieved by the IM sender system.

Once the IM sender system locates or receives the one or more personalization items associated with a destination recipient, the IM sender system renders the one or more personalization items for perception by the IM sender. Thus, the personalization items of the IM sender may be rendered to the IM sender similarly to the manner in which the personalization items of the IM sender are rendered to the IM recipient. Also, the personalization items of the IM recipient may be rendered to the IM recipient in the manner described for rendering the personalization items of the IM sender to the IM sender.

A personalization item may be rendered at any time. Typically, a personalization item is rendered upon the occurrence of one or more particular events. For example, a customized sound and/or a personalized icon or wallpaper selected by an IM sender may be made perceivable to an IM recipient during an IM conversation. In one instance, wallpaper selected by the IM sender appears on the IM recipient system when a message is received from the IM sender or when a message is returned to the IM sender by the IM recipient. As another example, a particular sound is played or an icon is displayed at the IM recipient system when the IM sender's presence state changes (e.g., when the IM sender logs on, logs off, becomes inactive, or enables or disables the TM recipient's ability to detect the IM sender's presence).

IM personalization items may be rendered for an IM sender and/or an IM recipient at the IM sender system, the IM recipient system, or both. The IM personalization items of the IM sender and the IM recipient may be rendered at the same time or at different times. The same method may be used to render the IM personalization items of the IM sender and/or the IM recipient at the IM sender system, the IM recipient system, or both. Alternatively, different methods may be used to render these IM personalization items. In one implementation, an IM recipient may not change the personalization items of an IM sender, and an IM sender may not change the personalization items of an IM recipient. An IM sender may choose to have different personalization items displayed for different IM recipients, and an IM recipient may choose to have different personalization items displayed for different IM senders. Once a personalization item is designated by an IM sender or an IM recipient, the personalization item is typically made available for perception by the IM recipient or the IM sender automatically. The personalization items may also be selected automatically for an IM sender or an IM recipient based upon a characteristic of the IM sender or the IM recipient.

IM personalization items may be rendered by any type of hardware, software, device, computer, computer system, equipment, component, program, application, code, storage medium, or propagated signal. In one implementation, the IM personalization items may be rendered in a client/host context, and the IM personalization items may be accessed or updated through a remote device in a client/host environment. In another implementation, the IM personalization items may be implemented in a standalone or offline client context. The IM personalization items may be rendered by the standalone/offline device and may be accessed or updated through a remote device in a non-client/host environment such as, for example, a LAN (Local Area Network) server serving an end user or a mainframe serving a terminal device.

Typically, IM communications involve an instantaneous or nearly instantaneous communication between two users, where each user is able to transmit, receive and display communicated information. Additionally, IM communications may involve the display and perception of online presence information regarding other selected users ("buddies"). However, IM communications may occur in the absence of online presence information. The IM communications may be machine-to-machine communications that occur without intervention by or communication through an instant messaging server after a communication session is established or authentication is performed. Examples of IM communications exist over AIM (America Online Instant Messenger), AOL (America Online) Buddy List and Instant Messages, Yahoo Messenger, MSN Messenger, and ICQ, among others. Although discussed below primarily with respect to IM applications, other implementations are contemplated for providing similar functionality in platforms and online applications such as chat, e-mail, and streaming media applications.

Figure 2:
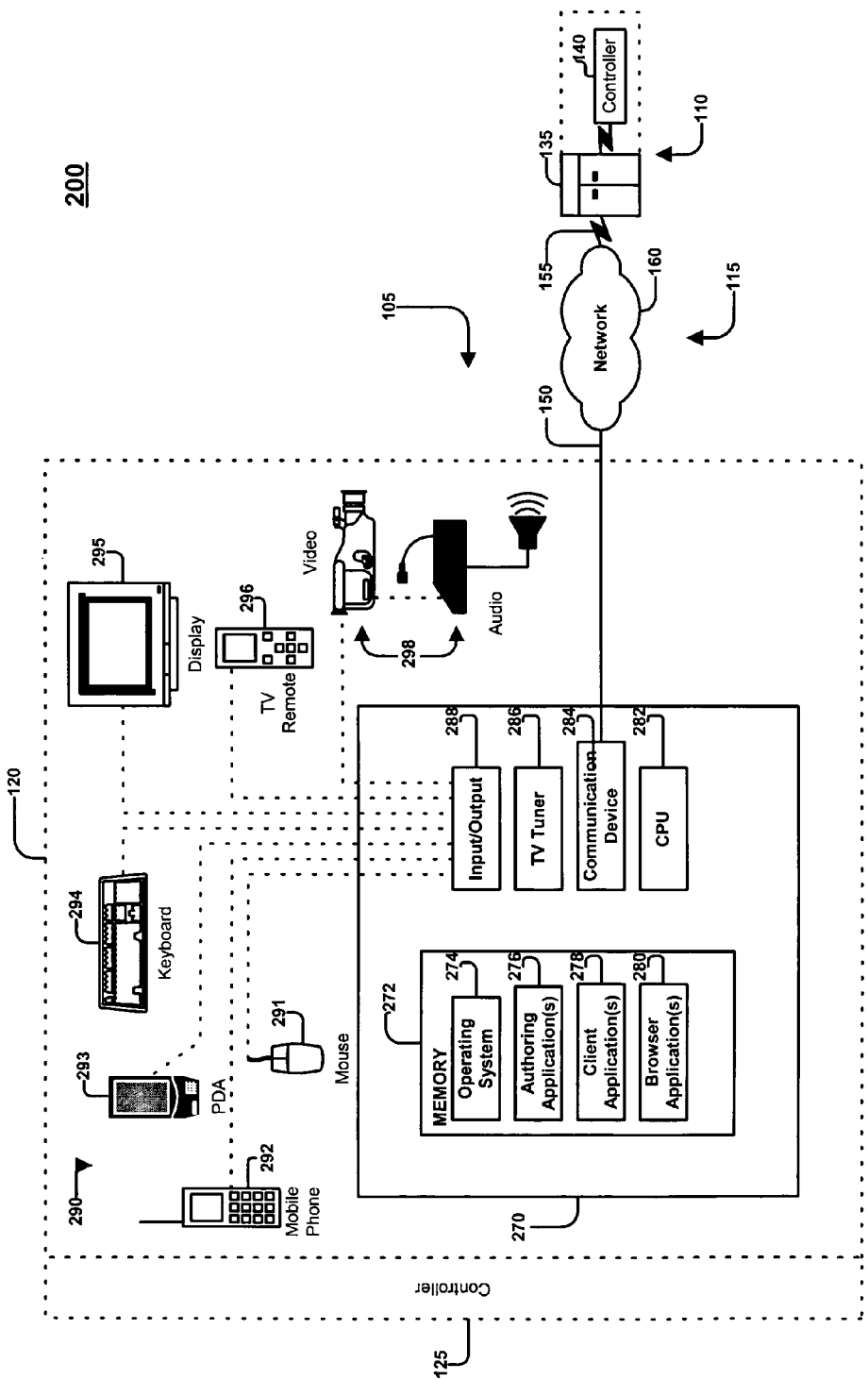

For illustrative purposes, FIGS. 1 and 2 show an example of a communications system for implementing techniques for transferring electronic data. For brevity, several elements in the figures described below are represented as monolithic entities. However, as would be understood by one skilled in the art, these elements each may include numerous interconnected computers and components designed to perform a set of specified operations and/or may be dedicated to a particular geographic region.

Referring to FIG. 1, a communications system 100 is capable of delivering and exchanging data between an IM sender system 105 and a host system 110 through a communications link 115. The IM sender system 105 typically includes one or more client devices 120 and/or client controllers 125, and the host system 110 typically includes one or more host devices 135 and/or host controllers 140. For example, the IM sender system 105 or the host system 110 may include one or more general-purpose computers (e.g., personal computers), one or more special-purpose computers (e.g., devices specifically programmed to communicate with each other and/or the IM sender system 105 or the host system 110), or a combination of one or more general-purpose computers and one or more special-purpose computers. The IM sender system 105 and the host system 110 may be arranged to operate within or in concert with one or more other systems, such as, for example, one or more LANs ("Local Area Networks") and/or one or more WANs ("Wide Area Networks").

The client device 120 and the host device 135 are generally capable of executing instructions under the command of, respectively, a client controller 125 and a host controller 140. The client device 120 and the host device 135 are connected to, respectively, the client controller 125 and the host controller 140 by, respectively, wired or wireless data pathways 130 and 145, which are capable of delivering data.

The client device 120, the client controller 125, the host device 135, and the host controller 140 typically each include one or more hardware components and/or software components. An example of a client device 120 or a host device 135 is a general-purpose computer (e.g., a personal computer) or software on such a computer capable of responding to and executing instructions in a defined manner. Other examples include a special-purpose computer, a workstation, a server, a device, a component, other physical or virtual equipment or some combination of these capable of responding to and executing instructions. The client device 120 and the host device 135 may include devices that are capable of establishing peer-to-peer communications.

An example of client controller 125 or host controller 140 is a software application loaded on the client device 120 or the host device 135 for commanding and directing communications enabled by the client device 120 or the host device 135. Other examples include a program, a piece of code, an instruction, a device, a computer, a computer system, or a combination of these for independently or collectively instructing the client device 120 or the host device 135 to interact and operate as described. The client controller 125 and the host controller 140 may be embodied permanently or temporarily in any type of machine, component, physical or virtual equipment, storage medium, or propagated signal capable of providing instructions to the client device 120 and the host device 135.

The communications link 115 typically includes a delivery network 160 that provides direct or indirect communication between the IM sender system 105 and the host system 110, irrespective of physical separation. Examples of a delivery network 160 include the Internet, the World Wide Web, WANs, LANs, analog or digital wired and wireless telephone networks (e.g., Public Switched Telephone Network (PSTN), Integrated Services Digital Network (ISDN), and Digital Subscriber Line (xDSL)), radio, television, cable, or satellite systems, and other delivery mechanisms for carrying data. The communications link 115 may include communication pathways 150 and 155 that enable communications through the one or more delivery networks 160 described above. Each of the communication pathways 150 and 155 may include, for example, a wired, wireless, cable or satellite communication pathway.

FIG. 2 illustrates a communications system 200 including an IM sender system 105 communicating with a host system 110 through a communications link 115.

The IM sender system 105 includes a client device 120 that typically includes a general-purpose computer 270 having an internal or external memory 272 for storing data and programs such as an operating system 274 (e.g., DOS, Windows™, Windows 95™, Windows 98™, Windows 2000™, Windows Me™, Windows XP™, Windows NT™, OS/2, or Linux) and one or more application programs. Examples of application programs include authoring applications 276 (e.g., word processing programs, database programs, spreadsheet programs, or graphics programs) capable of generating documents or other electronic content; client applications 278 (e.g., America Online (AOL) client, CompuServe client, AOL Instant Messenger (AIM) client, interactive television (ITV) client, Internet Service Provider (ISP) client, or instant messaging (IM) client) capable of communicating with other computer users, accessing various computer resources, and viewing, creating, or otherwise manipulating electronic content; and browser applications 280 (e.g., Netscape's Navigator or Microsoft's Internet Explorer) capable of rendering standard Internet content and other content formatted according to standard protocols such as the Hypertext Transfer Protocol (HTTP).

One or more of the application programs may be installed on the internal or external storage 272 of the general-purpose computer 270. Alternatively, in another implementation, the client controller 125 may access application programs externally stored in and/or performed by one or more device(s) external to the general-purpose computer 270.

The general-purpose computer 270 also includes a central processing unit 282 (CPU) for executing instructions in response to commands from the client controller 125, and a communication device 284 for sending and receiving data. One example of the communication device 284 is a modem. Other examples include a transceiver, a set-top box, a communication card, a satellite dish, an antenna, a network adapter, or some other mechanism capable of transmitting and receiving data over the communications link 115 through a wired or wireless data pathway 150. The general-purpose computer 270 optionally includes a television ("TV") tuner 286 for receiving television programming in the form of broadcast, satellite, and/or cable TV signals. The TV tuner 286 permits the client device 120 to selectively and/or simultaneously display network content received by communications device 284 and TV programming content received by the TV tuner 286.

The general-purpose computer 270 may include an input/output interface 288 that enables wired or wireless connection to various peripheral devices 290. Examples of peripheral devices 290 include, but are not limited to, a mouse 291, a mobile phone 292, a personal digital assistant (PDA) 293, an MP3 player (not shown), a keyboard 294, a display monitor 295 with or without a touch screen input, a TV remote control 296 for receiving information from and rendering information to users, and an audiovisual input device 298.

Although FIG. 2 illustrates devices such as a mobile telephone 292, a PDA 293, and a TV remote control 296 as being peripheral with respect to the general-purpose computer 270, in another implementation, such devices may themselves include the functionality of the general-purpose computer 270 and operate as the client device 120. For example, the mobile phone 292 or the PDA 293 may include computing and networking capabilities and function as a client device 120 by accessing the delivery network 160 and communicating with the host system 110. Furthermore, the IM sender system 105 may include one, some or all of the components and devices described above.

Figure 3:
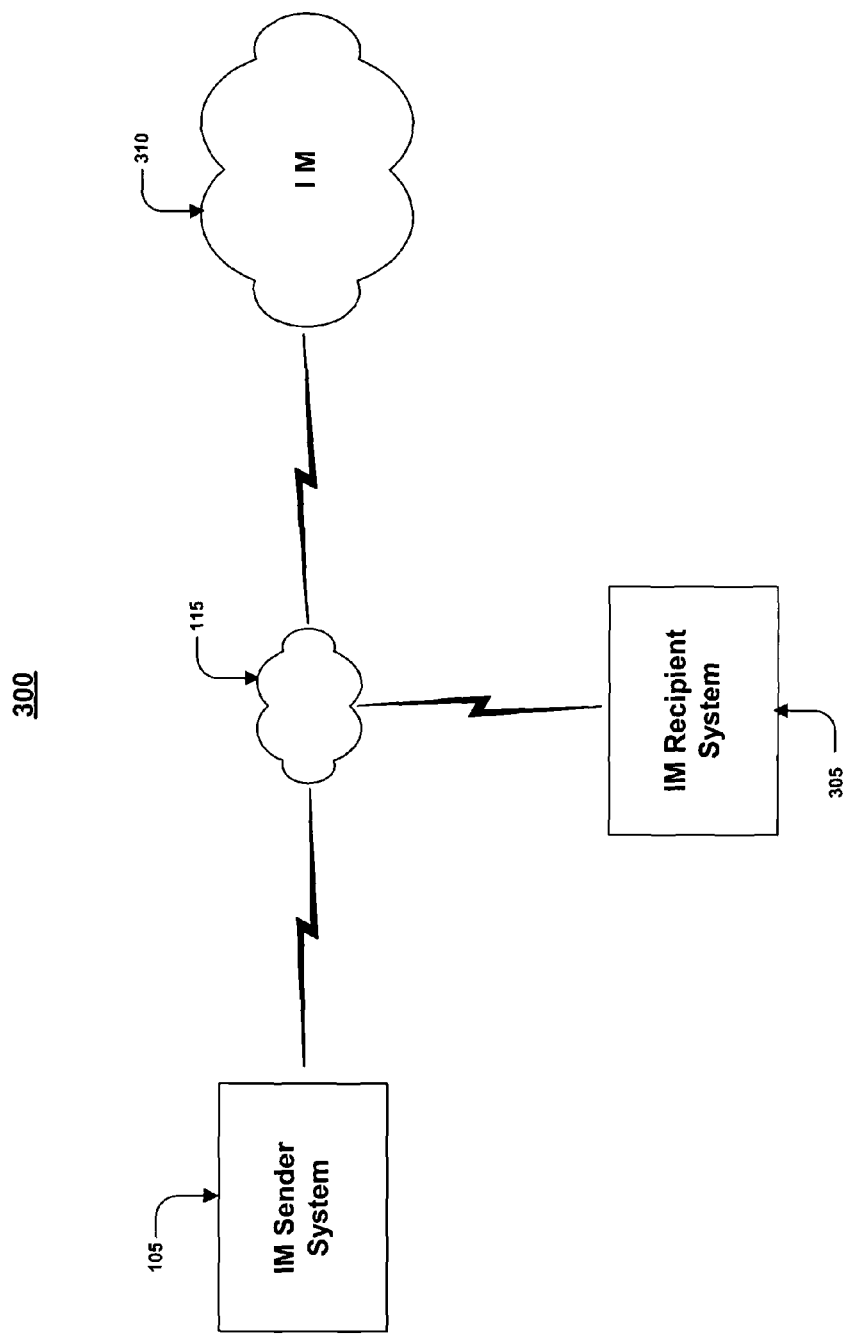

FIG. 3 illustrates a communications system 300 including an IM sender system 105 communicating with an IM recipient system 305 and an IM host system 310 through a communication link 115. Such a communications system may be used by users of IM service providers, such as, for example, AIM, ICQ, Yahoo Messenger, and Microsoft Messenger.

In one implementation, the IM host system 310 may have characteristics similar to those described above with respect to the host system 110, the IM recipient system 305 may have characteristics similar to those described above with respect to the IM sender system 105, and the IM sender system 105 and the IM recipient system 305 may include communication software to enable users of the client systems to access the IM host system 310.

The IM host system 310 may support IM services irrespective of an IM sender's network or Internet access. Thus, the IM host system 310 may allow users to send and receive IMs, regardless of whether they have access to any particular ISP. The IM host system 310 also may support associated services, such as administrative matters, advertising, directory services, chat, and interest groups related to the IM. The IM host system 310 has an architecture that enables the devices (e.g., servers) within the IM host system 310 to communicate with each other. To transfer data, the IM host system 310 employs one or more standard or exclusive IM protocols.

To access the IM host system 310 to begin an IM session in the implementation of FIG. 3, the IM sender system 105 establishes a connection to the IM host system 310. Once a connection to the IM host system 310 has been established, the IM sender system 105 may directly or indirectly transmit data to and access content from the IM host system 310. By accessing the IM host system, an IM sender can use the IM client application to view whether particular users ("buddies") are online, exchange IMs with particular buddies, participate in group chat rooms, trade files such as pictures, invitations or documents, find other buddies with similar interests, get customized information such as news and stock quotes, and search the Web. IM recipient system 305 may be similarly manipulated to establish contemporaneous connection with IM host system 310.

Once connectivity is established, an IM sender who is using IM sender system 105 may view whether an IM recipient using IM recipient system 305 is online, and typically may view whether the IM recipient is able to receive IMs. If the IM recipient is online, the IM sender may exchange IMs with the IM recipient.

In one implementation, the IMs sent between IM sender system 105 and IM recipient system 305 are routed through IM host system 310. In another implementation, the IMs sent between IM sender system 105 and IM recipient system 305 are routed through a third party server (not shown), and, in some cases, are also routed through IM host system 310. In yet another implementation, the IMs are sent directly between IM sender system 105 and IM recipient system 305.

Figure 4:
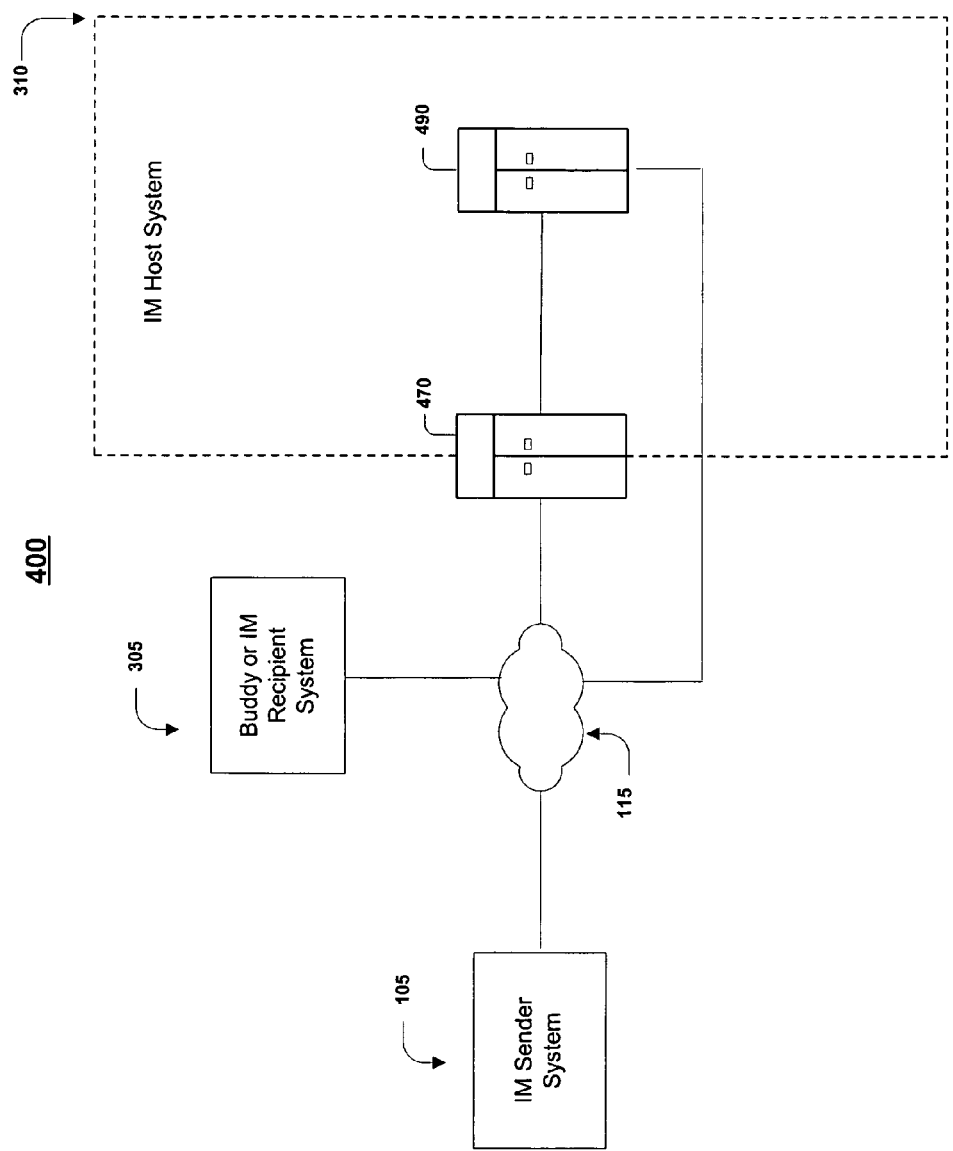

FIG. 4 illustrates a communications system 400 including an IM sender system 105 communicating with an IM recipient system 305 and an IM host system 310 through a communication link 115. System 400 illustrates a possible implementation of the communications system 300 of FIG. 3.

In system 400, the IM host system 310 includes a login server 470 for enabling access by users and routing communications between the IM sender system 105 and other elements of the TM host system 310. The TM host system 310 also includes an TM server 490. To enable access to and facilitate interactions with the TM host system 310, the IM sender system 105 and the TM recipient system 305 may include communication software, such as for example, an OSP client application and/or an TM client application.

As described with respect to FIG. 3, the TM host system 310 may support TM services irrespective of an IM sender's network or Internet access. Thus, the TM host system 310 may allow users to send and receive IMs, regardless of whether they have access to any particular ISP. The TM host system 310 also may support associated services, such as administrative matters, advertising, directory services, chat, and interest groups related to the IM. The IM host system 310 has an architecture that enables the devices (e.g., servers) within the IM host system 310 to communicate with each other. To transfer data, the TM host system 310 employs one or more standard or exclusive IM protocols.

In one implementation, the IM sender system 105 establishes a connection to the login server 470 in order to access the IM host system 310 and begin an IM session. The login server 470 typically determines whether the particular IM sender is authorized to access the IM host system 310 by verifying the TM sender's identification and password. If the IM sender is authorized to access the IM host system 310, the login server 470 usually employs a hashing technique on the IM sender's screen name to identify a particular IM server 490 within the IM host system 310 for use during the IM sender's session. The login server 470 provides the IM sender (e.g., IM sender system 105) with the IP address of the IM server 490, gives the IM sender system 105 an encrypted key, and breaks the connection. The IM sender system 105 then uses the IP address to establish a connection to the particular IM server 490 through the communications link 115, and obtains access to the IM server 490 using the encrypted key. Typically, the IM sender system 105 will be able to establish an open TCP connection to the IM server 490. The IM recipient system 305 establishes a connection to the IM host system 310 in a similar manner.

In one implementation, the IM sender system 105 may directly or indirectly transmit data to and access content from the IM server 490 once a connection to the IM server 490 has been established. By accessing the IM server, an IM sender can leverage the IM client application to determine whether particular users ("buddies" or potential IM recipients) are online, exchange IMs with particular buddies, participate in group chat rooms, trade files such as pictures, invitations or documents, find other buddies with similar interests, get customized news and stock quotes, and search the Web. For example an IM sender who is using IM sender system 105 may view whether a buddy using IM recipient system 305 is online, and if so, may exchange IMs with that buddy. In one implementation, the IMs sent between IM sender system 105 and IM recipient system 305 are routed through IM host system 310. In another implementation, the IMs sent between IM sender system 105 and IM recipient system 305 are routed through a third party server (not shown) and, in some cases, are also routed through TM host system 310. In yet another implementation, the IMs are sent directly between IM sender system 105 and IM recipient system 305.

In one implementation, the TM host system 310 also includes an IM sender profile server (not shown) connected to a database (not shown) for storing large amounts of user profile data. The user profile server may be used to enter, retrieve, edit, manipulate, or otherwise process user profile data. In one implementation, an IM sender's profile data includes, for example, the IM sender's screen name, buddy list, identified interests, and geographic location. The IM sender may enter, edit and/or delete profile data using an installed IM client application on the IM sender system 105 to interact with the user profile server.

Because the IM sender's data are stored in the IM host system 310, the IM sender does not have to reenter or update such information in the event that the IM sender accesses the IM host system 310 using a new or different IM sender system 105. Accordingly, when an IM sender accesses the TM host system 310, the TM server can instruct the user profile server to retrieve the TM sender's profile data from the database and to provide, for example, the TM sender's buddy list to the IM server. Alternatively, user profile data may be saved locally on the TM sender system 105.

Figure 5A:
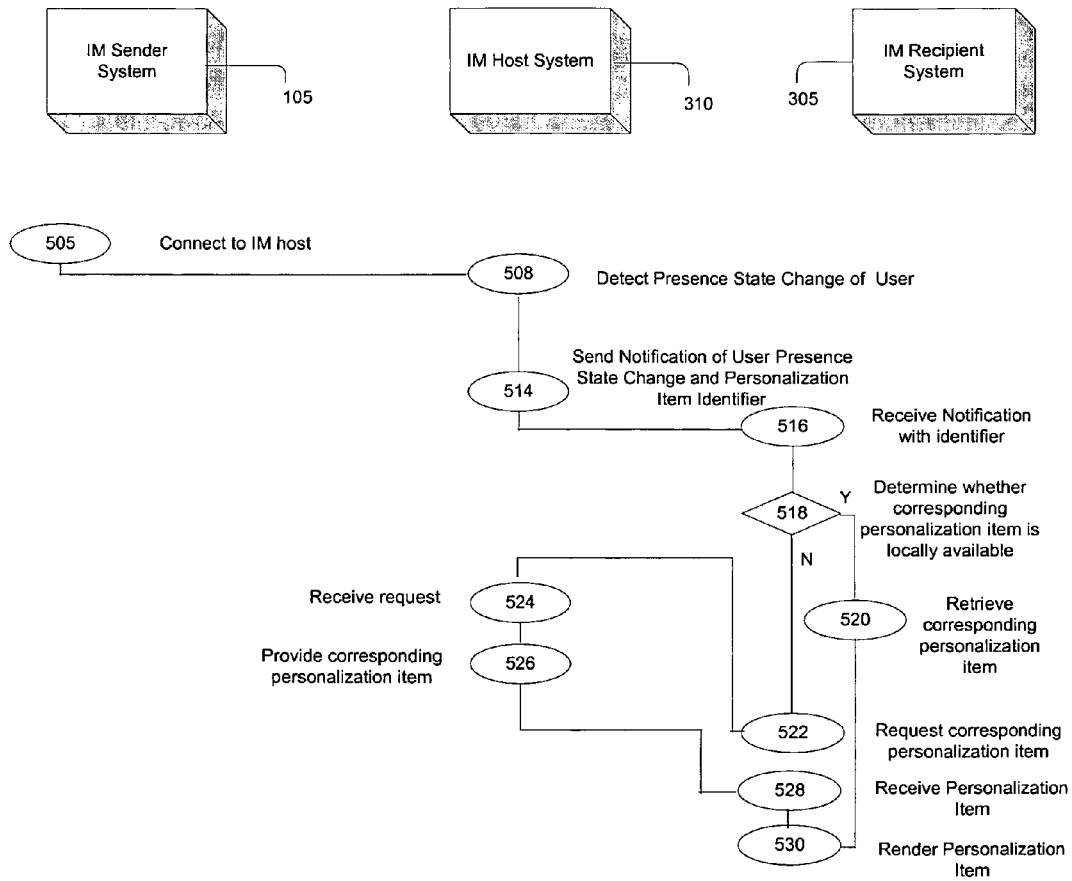
FIGS. 5A and 5B are flow charts of exemplary processes that may be implemented by systems such as those of FIGS. 1-4.
Figure 5B:
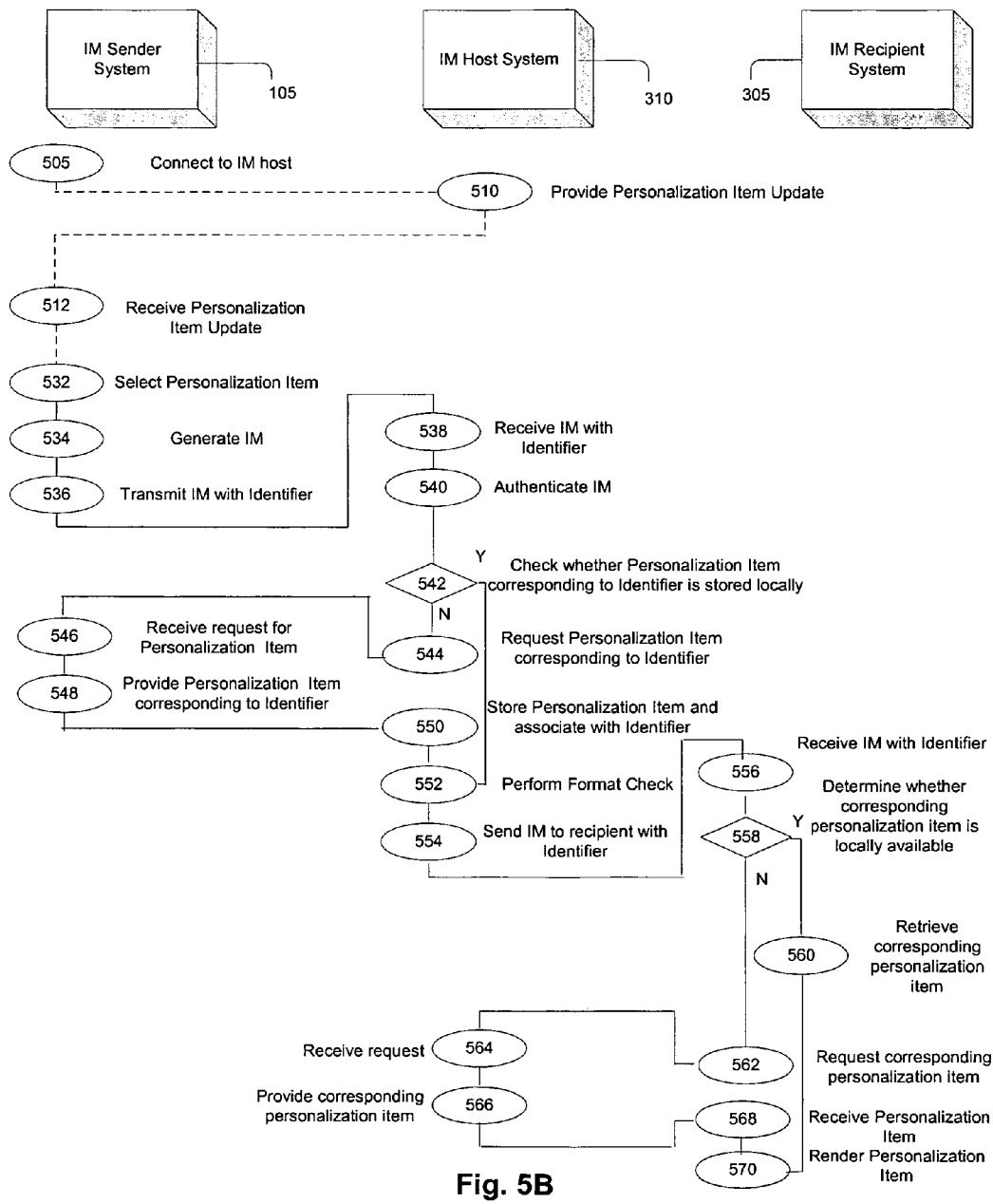

Referring to FIGS. 5A and 5B, the IM sender system 105, the IM recipient system 305, and the IM host system 310 interact according to exemplary procedures 500A and 500B to make a personalization item selected by the IM sender perceivable to the IM recipient during an instant messaging communications session. The procedures 500A and 500B may be implemented by any type of hardware, software, device, computer, computer system, equipment, component, program, application, code, storage medium, or propagated signal. Furthermore, although not shown in FIGS. 5A and 5B, the IM sender system 105, the IM recipient system 305, and the IM host system 310 may be directly or indirectly interconnected through known or described delivery networks, examples of which are described with respect to network 160. The procedures 500A and 500B may be implemented in a client/host context, or a standalone or offline client context. The personalization item may be rendered by the standalone/offline device and may be accessed or updated through a remote device in a non-client/host environment such as, for example, a LAN server serving an end user or a mainframe serving a terminal device. Thus, the procedures 500A and 500B described below may be implemented for any OSP, ISP, browser and/or other software program having a graphical user interface, such as programs for instant messaging, chat, electronic mail and stand-alone browsers.

Procedures 500A and 500B generally involve transporting and rendering a personalization item. While some functions of procedures 500A and 500B may be performed entirely by the IM sender system 105 or the IM recipient system 305, other functions may be performed by the collective operation of the IM sender system 105, the IM recipient system 305, and the IM host system 310. For example, a personalization item may be rendered entirely by the IM sender system 105. However, the UI may be rendered based upon information and/or instant messages provided to the IM recipient system 305 by the IM host system 310.

Referring to FIG. 5A, in the procedure 500A, the IM sender system 105 and the IM host system 310 are physically and/or logically connected (step 505). For instance, IM sender system 105 may connect to the IM host system 310 across a network (e.g., network 160) by supplying an IM sender identification and password to a server (e.g., a login server) in order to obtain access to the IM host system 310.

Next, the presence state change of the IM sender system 105, e.g., login state, is detected by the IM host system 310 (step 508). The IM host system 310 may detect other presence states or state changes, such as, for example, when the IM sender signs out, is inactive for a period of time, becomes active after having been inactive for a period of time, indicates an ability to receive instant messages, or indicates an inability to receive instant messages.

After detecting the presence state change of the IM sender system 105, the IM host system 310 may send or otherwise make accessible to other IM systems a notification of the IM sender presence state change to other IM systems (step 514). Sending notification of the presence state change may include sending an identifier corresponding to a personalization item selected by the IM sender system 105. For example, the IM host system 310 may send an identifier corresponding to a sound chosen by the IM sender system 105 for the presence state change.

In one implementation, the IM host system 310 assigns an identifier to the personalization item. In another implementation, the system sending the personalization item assigns the identifier to the personalization item.

The identifier typically includes information allowing the corresponding personalization item to be located and retrieved. For example, the identifier may include a location of the personalization item. The identifier also may include a type identifier that identifies the personalization item as, for example, an icon, an IM wallpaper, an emoticon, or a sound. The type identifier also may include a file format of the personalization item. Also, the identifier may include one or more flags to indicate, for example, if the personalization item is a custom item or an "official" item, has been banned, or has expired. Another flag may redirect the recipient to a different personalization item. The identifier may further include information concerning the size of the personalization item. The identifier may be in a predetermined format and may be of a predetermined length.

The IM recipient system 305 receives the notification from the IM host system 310 (step 516). In the above example, receiving the notification may include receiving an identifier corresponding to a personalization item selected by the IM sender system 105.

Next, the IM recipient system 305 determines whether the corresponding personalization item is locally available (step 518). For example, the IM recipient system 305 may have stored the personalization in a local memory or another local storage location. The IM recipient system uses the identifier to determine whether the corresponding personalization item is locally available. For instance, the identifier may contain the location at which the corresponding personalization item is stored.

If the corresponding personalization item is available locally, the IM recipient system retrieves the corresponding personalization item (step 520) and renders the personalization item (step 530).

Otherwise, if the corresponding personalization item is not available locally, the IM recipient system 305 requests the corresponding personalization item from the IM host system 310 or a location otherwise specified by or inferred from the identifier (step 522). That is, the IM recipient system 305 may request the corresponding personalization item from another location such as the IM sender system 105 or a remote, third party server. Requesting the corresponding personalization item may include sending the identifier associated with the personalization item to the IM host system 310 along with a request to download the personalization item to the IM recipient system 305.

When the IM host system 310 receives the request for a personalization item from the IM recipient system (step 524), and the personalization item is available, the IM host system 310 provides the corresponding personalization item to the IM recipient system (step 526). Receiving the request may include having the IM host system 310 receive the identifier associated with the personalization item along with a request to download the personalization item to the IM recipient system 305.

Next, the corresponding personalization item is received by the IM recipient system (step 528), which may save the personalization item in a memory or other storage at the local IM recipient system 305. Then, the personalization item is rendered (step 530). For example, as discussed below with respect to FIG. 13, the personalization items may include personalization items for a buddy list UI 1300.

Referring to FIG. 5B, in procedure 500B, after the IM sender system 105 connects to the IM host system 310 (step 505), the IM host system 310 optionally may provide the IM sender system 105 with a personalization item update or notification (step 510), which generally is responsive or related to the detected state of the IM sender system 105. For example, if personalization items corresponding to certain identifiers have changed or expired, the updated personalization item may be transmitted to the IM sender system 105. The update may be automatic or may be requested by the IM sender system 105.

The IM sender system 105 may receive the personalization item update or notification when first accessing IM host system 310 (step 512), or at a later time, assuming that updates exist. Updates received by IM sender system 105 may be stored locally at the IM sender system 105.

Based on personalization updates received (optional steps 510 and 512) and other personalization items available, a personalization item is selected at the IM sender system 105 (step 532). As discussed below with respect to FIGS. 6-9, 11 and 12, the selection may be made with the assistance of IM sender interfaces 600, 700, 800, 900, 1100 and 1200, and the IM sender may make the selection using a mouse or other input device.

The personalization items may be selected manually by the IM sender or may be automatically selected for the IM sender. The IM sender personalization items may be made available to the IM sender system and rendered at the IM sender system by selecting the identifiers corresponding to the personalization items of the IM sender. The identifiers may be associated with a screen name or other identifying information of the IM sender. For example, the identifiers may be associated with the screen name of the IM sender and stored locally at the IM sender system, or the IM sender system may retrieve the identifiers associated with the screen name of the IM sender from another location, such as the IM host system or another remotely-accessible data store.

The IM sender system uses the identifier to determine if the corresponding personalization item is available locally at the IM sender system, and if so, the IM sender system retrieves the corresponding personalization item. If the personalization item is not available locally at the IM sender system, the IM sender system requests the personalization item from another location such as an IM host system or another remotely-accessible data store. Alternatively, the personalization item itself may be associated with the IM sender and retrieved by the IM sender system. Once the IM sender system locates or receives the personalization item, the IM sender system renders the item for perception by the IM sender.

Thereafter, an instant message is generated by the IM sender system 105 to be sent to the IM recipient system 305 (step 534). In one implementation, the IM sender may generate the instant message by manipulating a UI, such as the UI 1500 shown in FIG. 15. The UI 1500 may include personalization items of the IM recipient, such as wallpaper 1507 and a buddy icon 1509 of the IM recipient ("SurfinDiane").

To make the personalization items of the IM recipient (for example personalization items 1507 and 1509) available to the IM sender in UI 1500, the IM sender system 105 selects the identifiers corresponding to the personalization items (for example, 1507 and 1509) of the IM recipient. The identifiers may be associated with a screen name or other identifying information of the IM recipient. For example, the identifiers may be associated with the screen name of the IM recipient and stored locally at the IM sender system 105, or the IM sender system may retrieve the identifiers associated with the screen name of the IM recipient from a remotely-accessible data store such as the IM host system 310, the IM recipient system 305, or a remote or third-party server. As such, personalization items of the IM recipient may be made available to the IM sender before the receipt by the IM sender of an IM from the IM recipient.

The IM sender system 105 uses the identifiers to identify the personalization item associated with the recipient, and to locate perceivable content corresponding to the identifier. For instance, an identifier received from a recipient may be used as a basis for determining if the corresponding personalization items are available locally at the IM sender system, and if so, may be used to retrieve the corresponding personalization items. If the personalization items are not available locally at the IM sender system 105, the IM sender system may use the identifiers as a basis for generating one or more requests for the personalization items from another location such as the IM host system 310 or another remotely-accessible data store, such as the IM recipient system 305 or a remote or third-party server. Once the IM sender system 105 locates or receives the personalization items, that system renders the items for perception by the IM sender.

Figure 14:
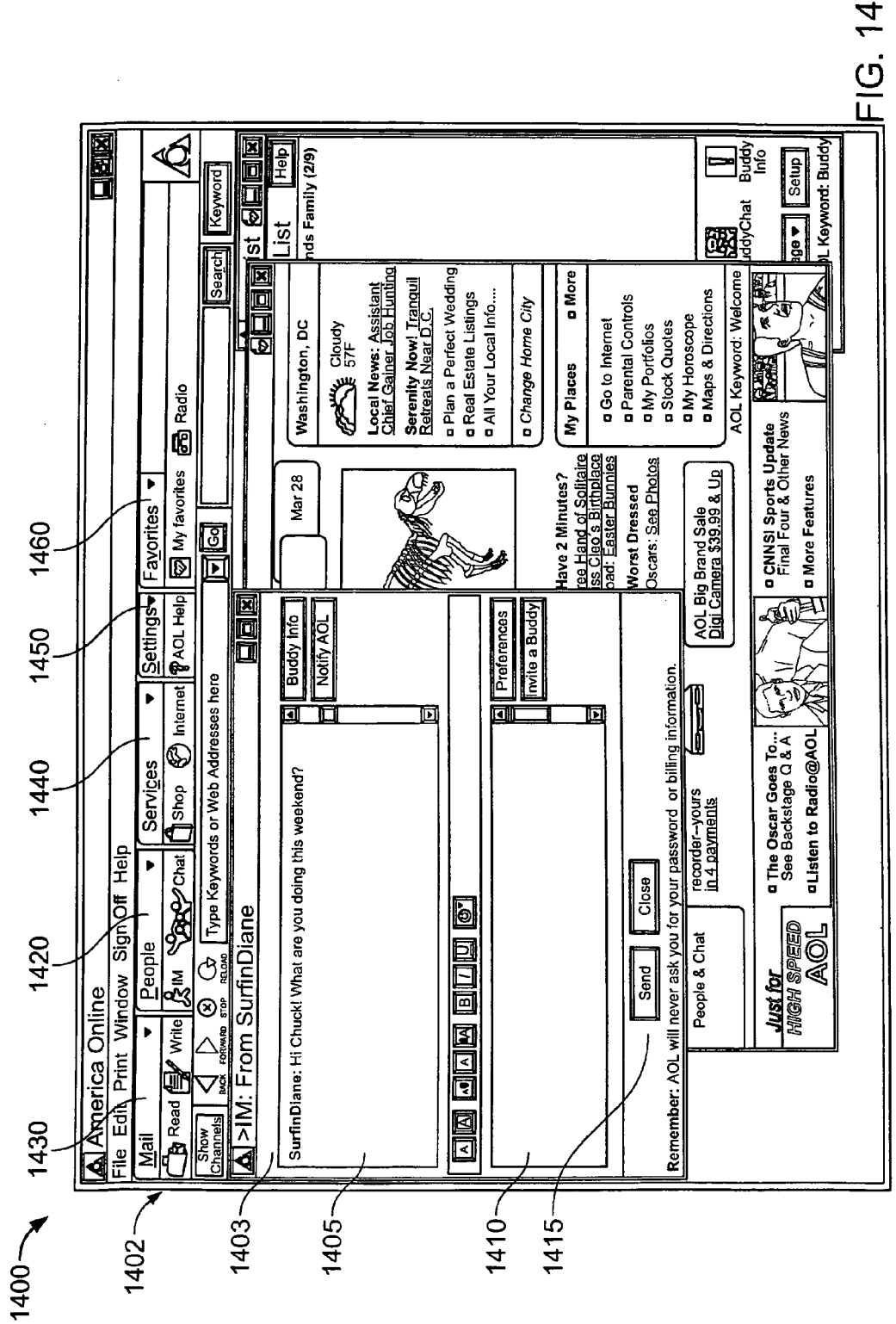

Next, the IM sender system 105 transmits the instant message along with an identifier corresponding to each personalization item to the IM host system 310 (step 536). Referring to FIG. 14, the IM sender may manipulate a general interface actionable item 1420 to render an IM sender interface 1403. The IM sender may select the screen name of the IM recipient system, cause the IM UI to be rendered, and type the message in a IM compose area 1410 to generate the IM. The IM sender system 105 includes one or more personalization items to be transported in the instant message. The instant message may be transmitted, for example, by selecting a send control 1415.

The IM host system 310 receives the instant message and the identifier (step 538). The IM host system 310 then may authenticate the instant message for security purposes (step 540)

The IM host system 310 determines whether the corresponding personalization item is stored at the IM host 310 (step 542). The IM host system 310 may have stored the personalization on a server 390 or in a local memory or other local storage location. The IM host system 310 uses the identifier in determining whether the corresponding personalization is available locally. For instance, the identifier may contain the location at which the corresponding personalization item is stored. If the corresponding personalization item is available locally at the IM host system 310, a format check may be performed on the personalization item (step 552) and the personalization item may be made available to the IM recipient system 305 (step 554).

Otherwise, if the corresponding personalization item is not available at the IM host system 310, the IM host system 310 may request the corresponding personalization item from the IM sender system (step 544). Alternatively, the IM host system 310 may request the corresponding personalization item from another location, such as the IM recipient system 305 or a remote, third party server. Requesting the corresponding personalization item may include sending the identifier associated with the personalization item to the IM sender system 105 along with a request to download the personalization item to the IM host system 310.

The IM sender system 105 receives the request for the personalization item from the IM host system (step 546). Receiving the request may include receiving the identifier associated with the personalization item along with a request to download the personalization item to the IM host system 310.

The IM sender system 105 provides the corresponding personalization item to the IM recipient system (step 548). The personalization item provided by the IM sender system may include a user-customized personalization item.

The corresponding personalization item is received by the IM host system 310 and the personalization item and/or the associated identifier are stored (step 550). Storing the personalization item and/or the identifier may include saving the personalization item and/or the identifier in a memory or other storage at the IM host system 310.

A format check may be performed on the personalization item (step 552). The format check may include comparing the actual format of the personalization item to the expected format of the personalization item based upon the identifier.

The IM host system 310 sends the IM message and the identifier corresponding to the selected personalization item to the IM recipient system 305 (step 554). Because various aspects of steps 554-570 are similar to those discussed above with respect to steps 514-530 of procedure 500A, the following discussion of steps 554-570 is somewhat abbreviated.

In one implementation, the IM host system 310 assigns an identifier to the personalization item. In another implementation, the client system sending the personalization item assigns the identifier to the personalization item.

The IM recipient system 305 receives the notification from the IM host system 310 (step 556). Receiving the notification includes receiving an identifier corresponding to the personalization item selected by the IM sender system 105, as discussed above with respect to step 516.

Next, the IM recipient system 305 determines whether the corresponding personalization item is available locally (step 558). As discussed above with respect to step 518, the IM recipient system 305 may have stored the personalization in a local memory or other local storage location. The IM recipient system 305 uses the identifier to determine whether the corresponding personalization is available locally. For instance, the identifier may contain the location at which the corresponding personalization item is stored.

If the corresponding personalization item is available locally, the IM recipient system 305 retrieves the corresponding personalization item (step 560) and the personalization item is rendered (step 570).

Otherwise, if the corresponding personalization item is not available locally, the IM recipient system 305 requests the corresponding personalization item from the IM host system 310 (step 562). Alternatively, as discussed above with respect to step 522, the IM recipient system 305 may request the corresponding personalization item from another location, such as the IM sender system 105 or a remote, third party server. In one implementation, the personalization item may be provided by a third party, and may be made available in consideration of a payment by the IM sender or the IM recipient. Requesting the corresponding personalization item may include sending to the IM host system 310 the identifier associated with the personalization item along with a request to download the personalization item to the IM recipient system 305.

The IM host system 310 receives the request for the personalization item from the IM recipient system 305 (step 564). As discussed above with respect to step 524, receiving the request may include receiving the identifier associated with the personalization item along with a request to download the personalization item to the IM recipient system 305. The IM host system 310 provides the corresponding personalization item to the IM recipient system 305 (step 566).

The corresponding personalization item is received by the IM recipient system 305 (step 568). As discussed above with respect to step 528, receiving the corresponding personalization item may include saving the personalization item in a memory or other storage at the local IM recipient system 305.

Finally, the personalization item is rendered (step 570). As discussed below with respect to FIG. 15, the personalization item to be rendered may include a buddy icon 1509 or IM wallpaper 1507.

The relative order of steps 505-530 with respect to other steps in procedure 500A, and the relative order of steps 505-570 with respect to other steps in procedure 500B, and also with respect to each other, may vary. For example, a personalization update (step 510 of FIG. 5B) may be performed during, after, or simultaneously with sending notification of an IM sender presence state change (step 514 of FIG. 5A). Also, certain steps may be omitted entirely, as appropriate. For example, referring to FIG. 5A, if the IM sender has not chosen a personalization item to be sent to the IM recipient system 305 upon a presence state change, then no such item will be sent and steps 516-530 may be eliminated entirely. In another example, referring to FIG. 5B, steps 540-552 may be eliminated such that, after receiving the IM with the identifier from the IM sender system, the host next sends the IM with the identifier to the TM recipient system.

Figure 6:
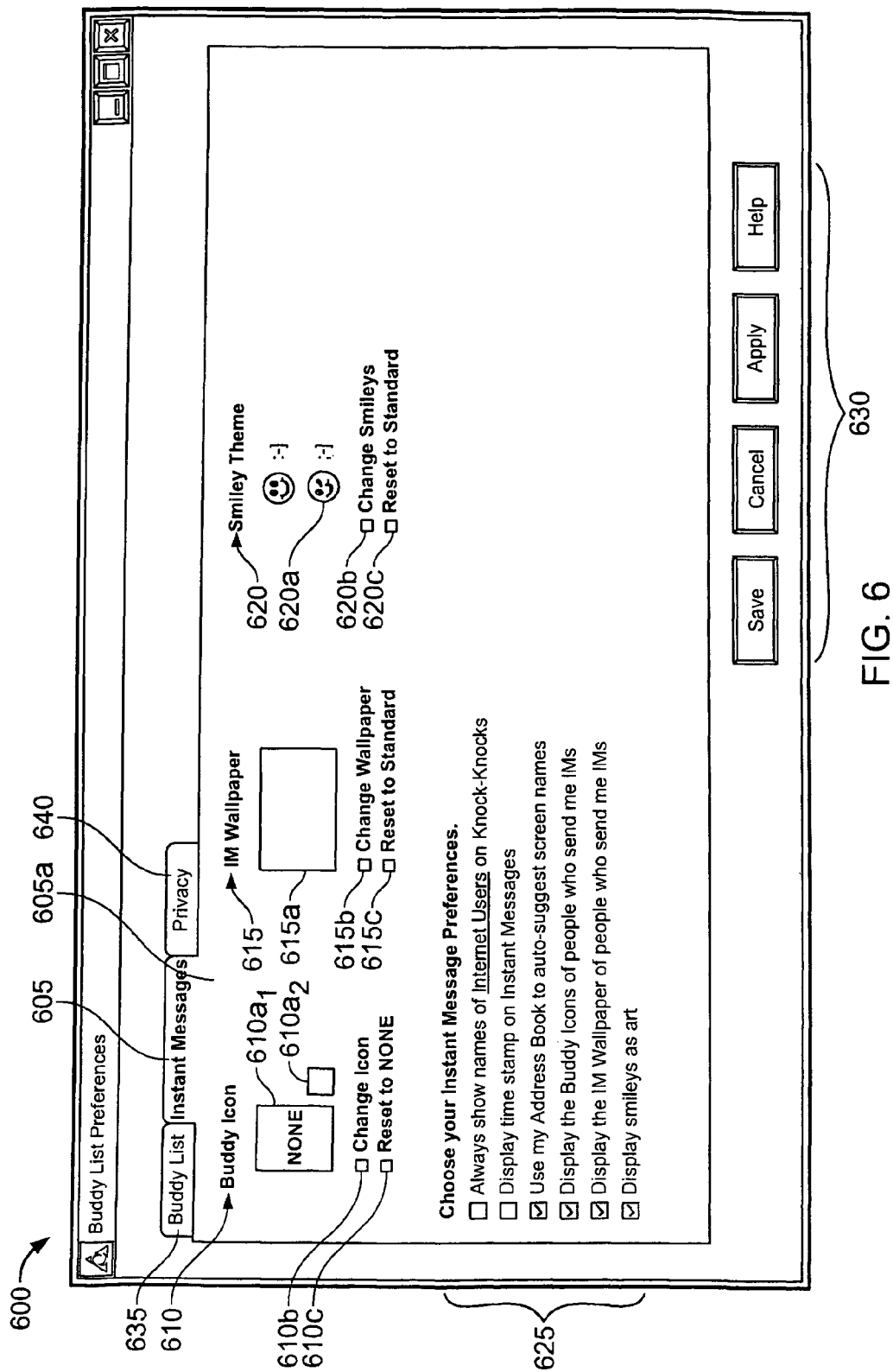
FIGS. 6-17 are illustrations of different graphical user interfaces that may be implemented by systems such as those of FIGS. 1-4 when executing processes such as those of FIGS. 5A and 5B.

FIG. 6 illustrates one example of an IM sender UI 600 for enabling an IM sender to select personalization items (e.g., at step 532). The UI 600 may be presented to an IM sender of an IM service provider. In general, the UI 600 is rendered on the IM sender system 105 using software stored on the IM sender system 105. The personalization items to be selected by the IM sender may be stored on the IM sender system 105, on the IM host system 310, or on a different host system 110 such as a host system of an authorized partner.

The UI 600 includes menu tabs 605, 635 and 640 that each have a corresponding menu to assist the IM sender with selecting personalization items. For example, as shown in FIG. 6, the menu 605a corresponding to menu tab 605 enables an IM sender to make selections of personalization items including buddy icons 610, IM wallpaper 615, and smiley (i.e., emoticon) themes 620. The IM sender's current selections of buddy icon $610a_1$, mini buddy icon $610a_2$, IM wallpaper 615a, and smiley theme 620a are displayed. Each of these personalization items may be made available to and rendered by an IM recipient during an IM conversation with the IM sender.

A control 610b is provided for the IM sender to select a large buddy icon $610a_1$ and/or a mini-buddy icon $610a_2$, and a control 610c is provided to enable reset of the buddy icon selections back to a default setting (e.g., none). Another control 615b is provided to enable selection of IM wallpaper 615a, and a control 615c is provided to enable reset of the IM wallpaper selection back to a default setting. Yet another control 620b is provided to enable a smiley theme 620a, and a control 620c is provided for the IM sender to reset the smiley theme selection back to a default setting.

Other controls 625 are provided for functions such as, for example, showing the names of users who are not on a buddy list, displaying a timestamp on instant messages, using an address book to automatically suggest screen names, displaying the buddy icons of people who send instant messages to the IM sender, displaying the IM wallpaper of people who send instant messages to the IM sender, and displaying smileys as art. Controls 630 are provided for the IM sender to save the changes made, apply the changes, cancel the changes, or get help.

Figure 7:
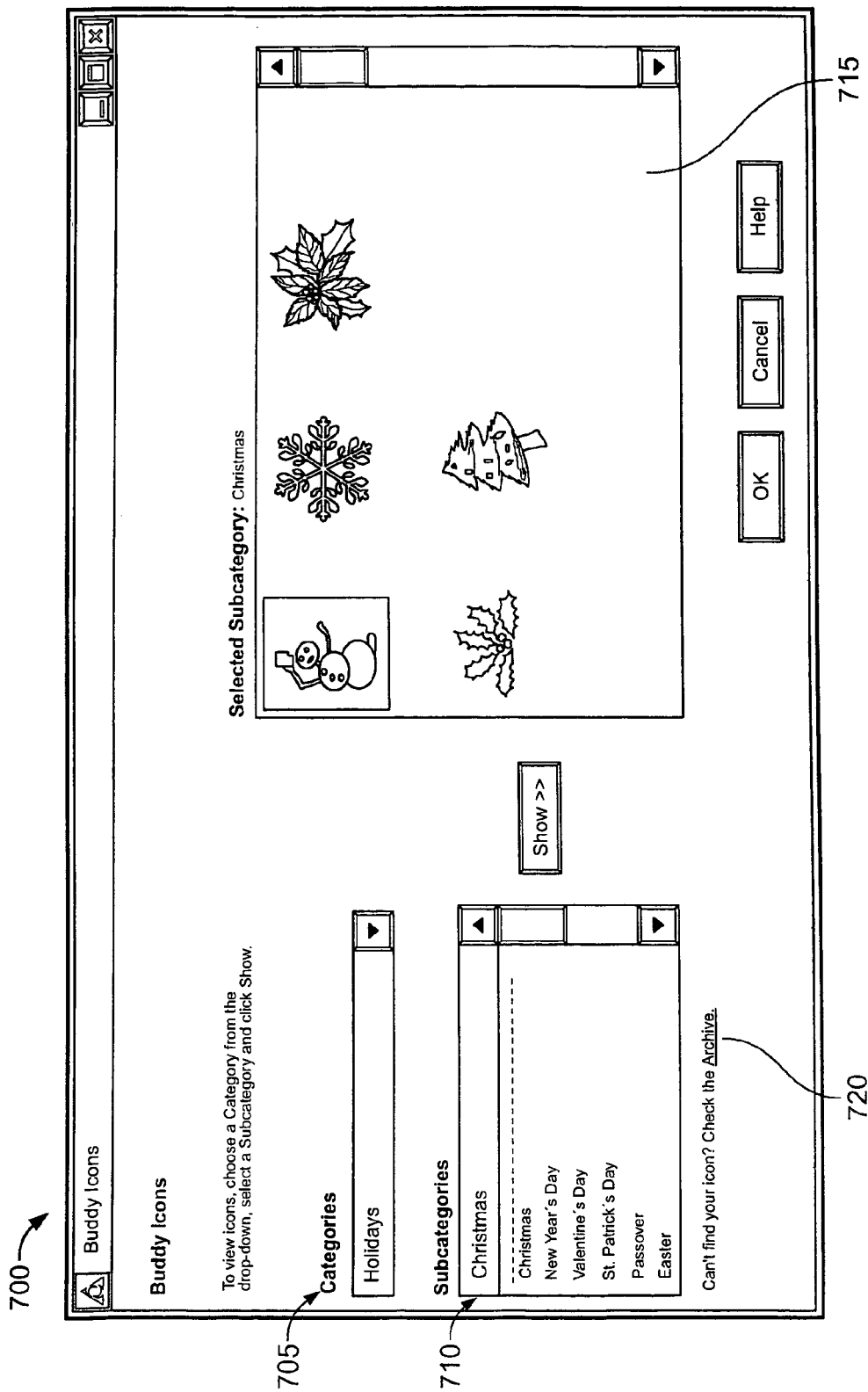

FIG. 7 illustrates an example of an IM sender UI 700 for enabling an IM sender to select a buddy icon (i.e., a personalization item). The UI 700 is rendered in response to user manipulation of a control 610b (shown in FIG. 6). In the example of FIG. 7, the IM sender is presented with a list of buddy icon categories 705 and a list of subcategories 710 corresponding to a selected category. When an IM sender selects a category 705 and a subcategory 710, a window 715 displays the personalization items available in the selected subcategory. The IM sender may select a personalization item by, for example, using a mouse or other input device to make a selection among the available personalization items displayed in the window 715. Also, an archive 720 of old personalization items may be provided for IM sender selection. In another implementation, the IM sender may provide a custom buddy icon as a personalization item.

Figure 8:
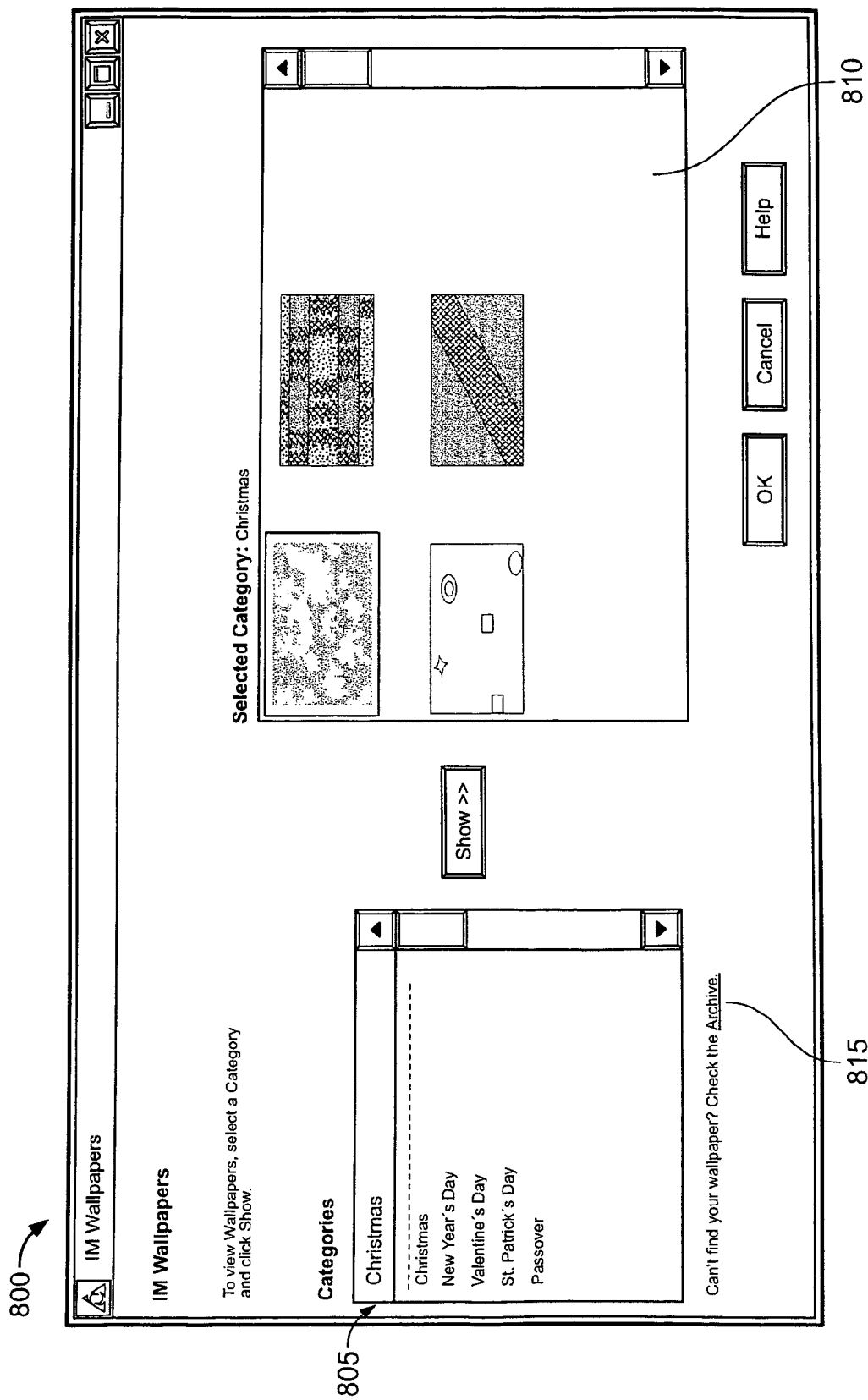

FIG. 8 illustrates an example of a UI 800 for enabling an IM sender to select IM wallpaper. The UI 800 is rendered in response to user manipulation of a control 615b (shown in FIG. 6). In the example of FIG. 8, the IM sender is presented with a list of IM wallpaper categories 805. When an IM sender selects a category 805, a window 810 displays the personalization items available in the selected category. The IM sender may select a personalization item by, for example, using a mouse or other input device to make a selection among the available items in the window 810. Also, an archive 815 of old personalization items may be provided for user selection. In another implementation, the IM sender may provide a custom IM wallpaper as a personalization item.

Figure 9:
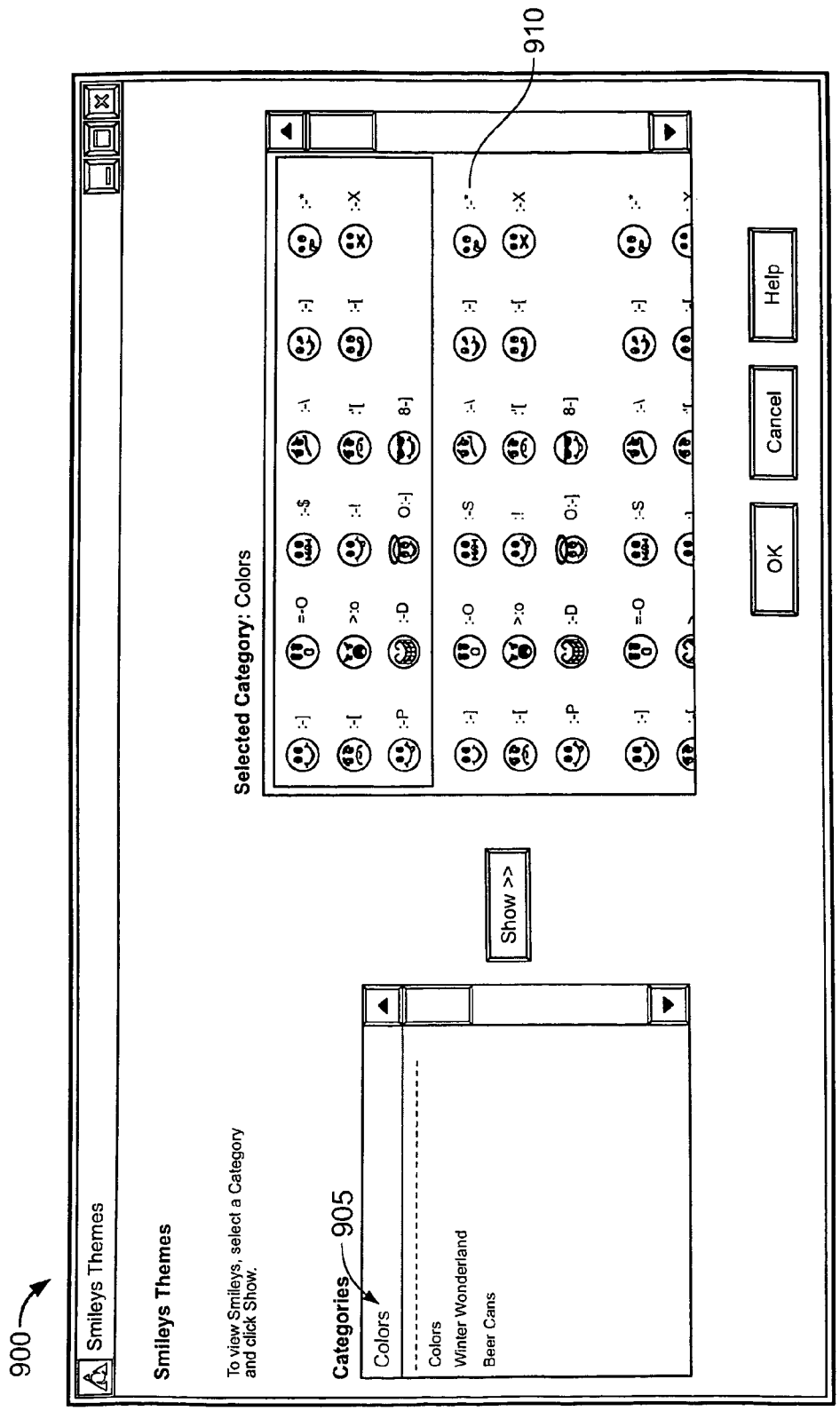

FIG. 9 illustrates yet another example of a UI 900 for enabling an IM sender to select smiley themes. The UI 900 is rendered in response to user manipulation of a control 620b (shown in FIG. 6). In the example of FIG. 9, the IM sender is presented with a list of smiley theme categories 905. When an IM sender selects a category 905, a window 910 displays the personalization items available in the selected category. The IM sender may select a personalization item by, for example, using a mouse or other input device to make the selection among the available items in the window 910. Also, an archive of old personalization items may be provided for IM sender selection. In another implementation, the IM sender may provide a custom smiley theme as a personalization item.

Figure 10:
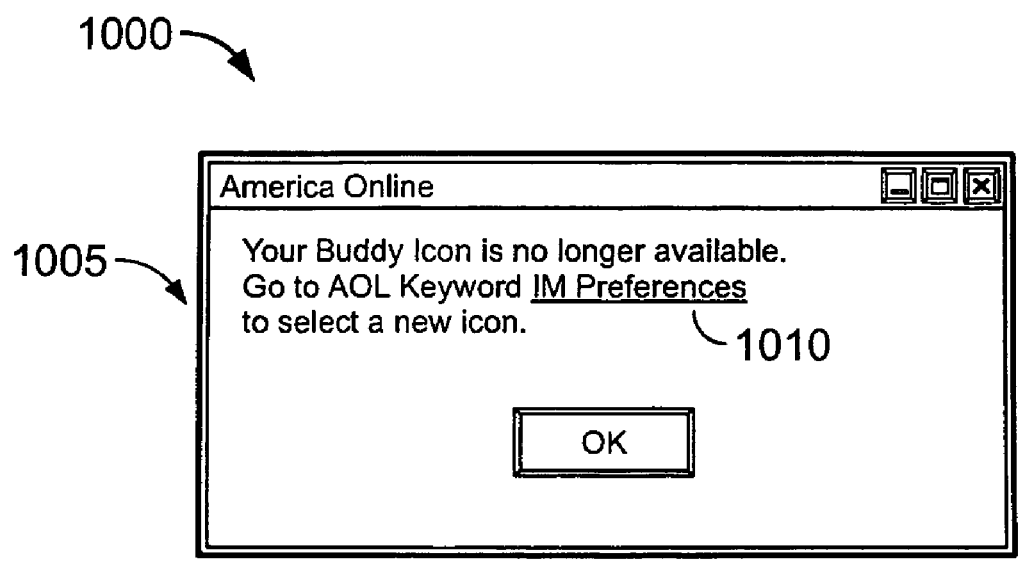

FIG. 10 illustrates an example of a UI 1000 that may be rendered to an IM sender if the IM sender's personalization item selection is not available. A message 1005 may be rendered to the IM sender informing the IM sender that the item is not available, and a link 1010 may be provided to an interface, such as one of the interfaces shown in FIGS. 6-9, to allow the IM sender to select another personalization item.

Figure 11:
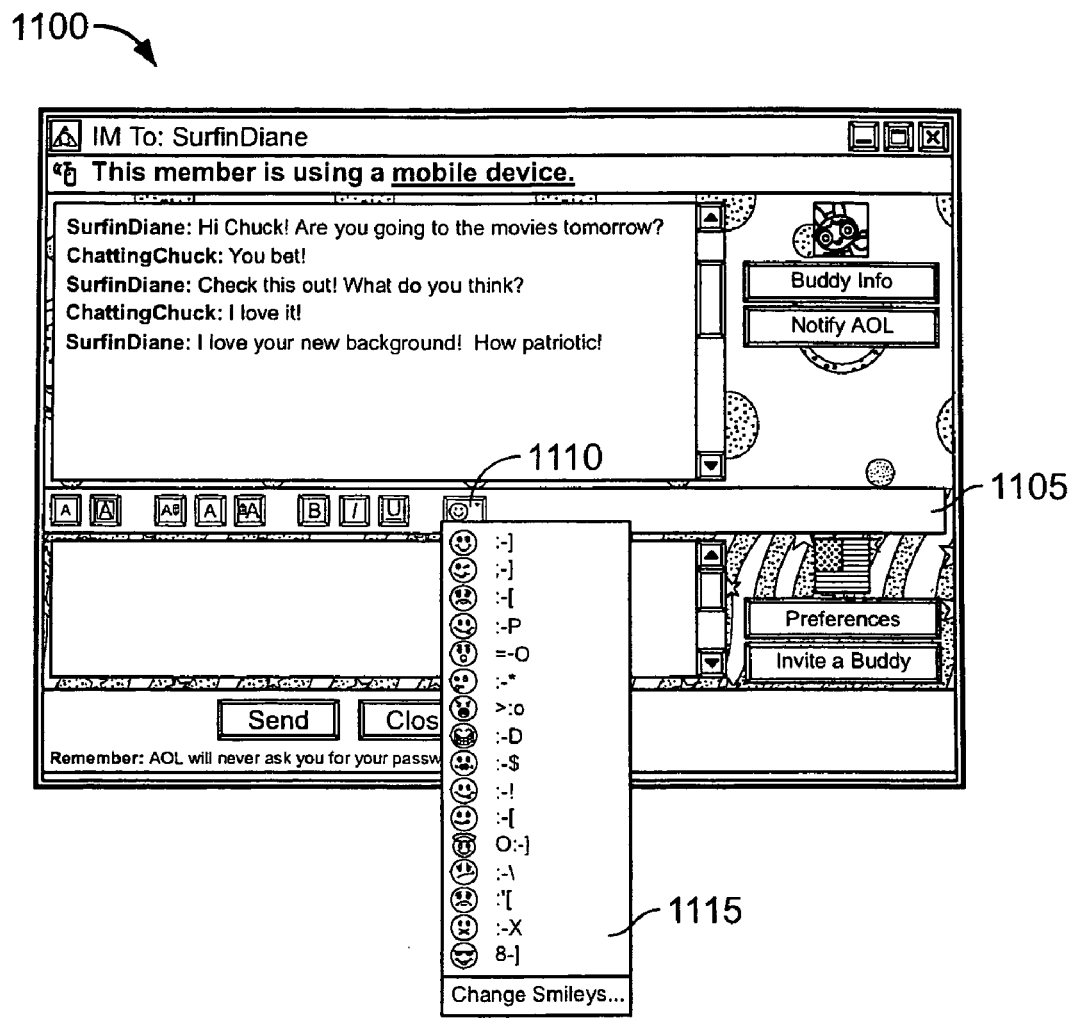

FIG. 11 illustrates an instant messaging UI 1100. In the example of FIG. 11, an IM sender is presented with a control bar 1105 that includes a drop down control 1110. When activated, drop down control 1110 causes the display of a drop down menu 1115 that shows the IM sender's current selection of smiley theme personalization items.

Figure 12:
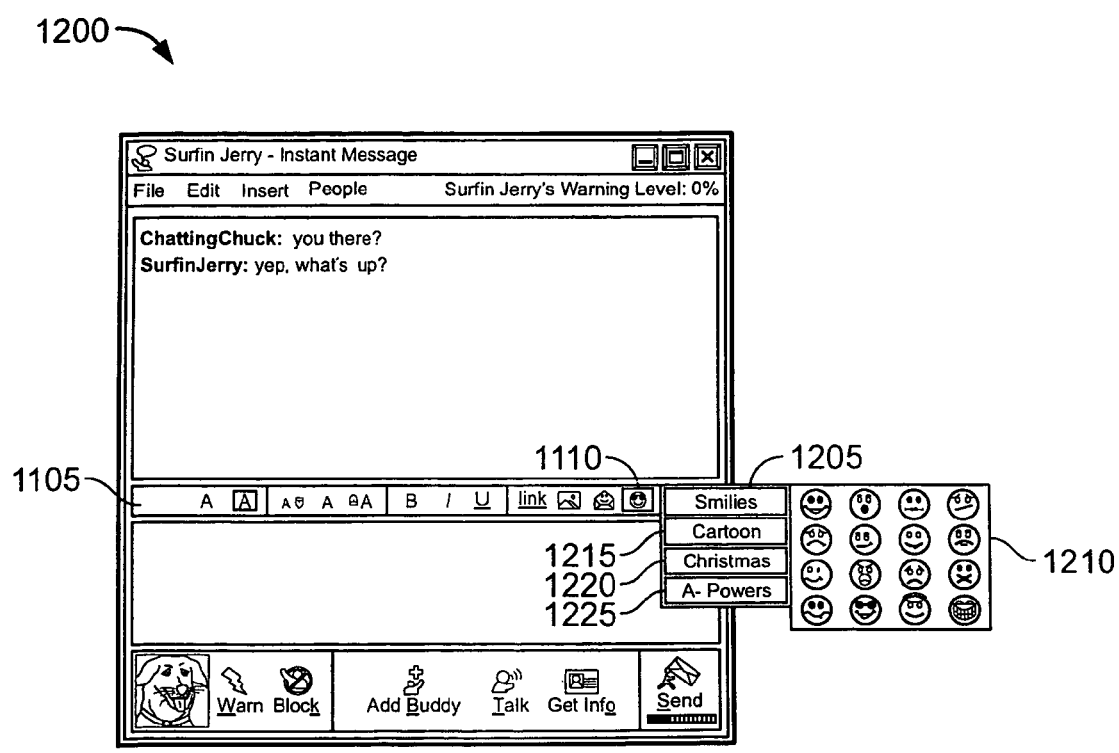

FIG. 12 is an example of an instant messaging UI 1200 and further illustrates the UI discussed above with respect to FIG. 11. In the example of FIG. 12, the drop down control 1110, when activated, causes the display of sub-menus 1205, 1215, 1220, and 1225. Each sub-menu enables the IM sender to select various personalization items. For example, sub-menu 1205, when selected, causes the display of menu 1210 for enabling the IM sender to select a smiley personalization item which may be sent in an IM to an IM recipient.

Figure 13:
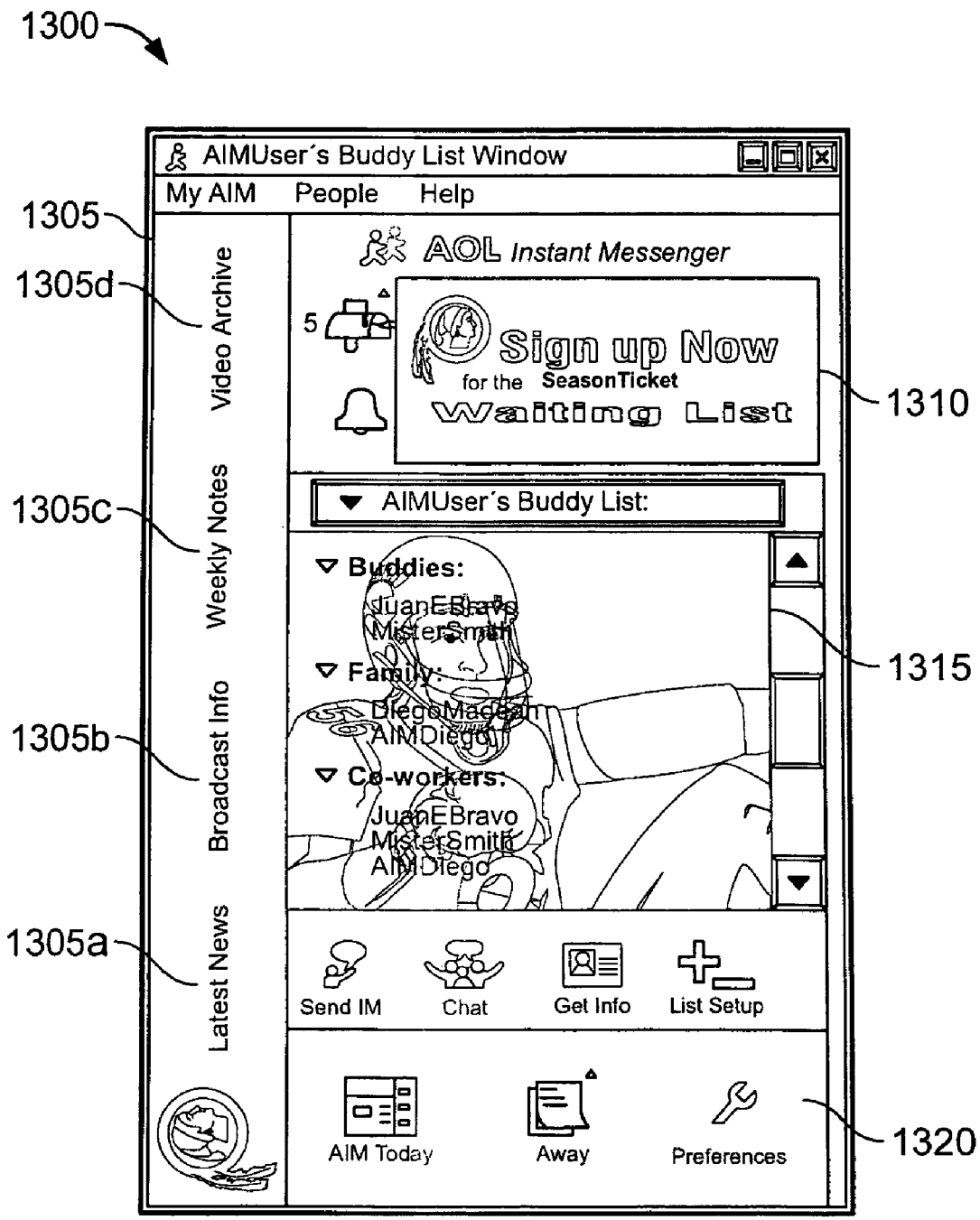

FIG. 13 is an example of an instant messaging buddy list UI 1300 that enables an IM sender of an instant messaging service to, among other things, perceive the presence state of other buddies that the IM sender has added to a buddy list, and to send instant messages to buddies on the buddy list. The buddy list may include personalization items such as a buddy list bar 1305, a buddy list image 1310, a buddy list background image 1315, and a buddy list fill pattern 1320. The IM sender may select the personalization items manually, or the personalization items may be selected automatically for the IM sender. The personalization items may be rendered to the IM sender as described above with respect to step 532 of FIG. 5B.

The buddy list bar 1305 may contain personalized links 1305a, 1305b, 1305c, and 1305d to content and may have a customized appearance. The buddy list image 1310 and the buddy list background image 1315 may be, for example, image files. The buddy list background image 1315 may have a washed out appearance. The buddy list fill pattern 1320 may be a color or pattern background for the buddy list, or may also be an image. One or more of these personalization items may be transmitted to an IM recipient and rendered on the IM recipient system 305. The transmission of the personalization items may occur during machine-to-machine communications that are not visible to the user.

FIG. 14 illustrates an example of a UI 1400 that may be presented to a user of an online service provider. The UI 1400 includes a toolbar 1402 for quickly enabling activation of features such as, for example, reading or writing e-mail, exchanging IM messages with another user, entering chat areas with other users, shopping or accessing the internet. The toolbar 14025 may include one or more general interface actionable items 1420-1460, each of which is configured to enable activation of an associated user interface. An actionable item may be, for example, a button or a tab. For example, general actionable item 1420 is configured to enable activation of associated Instant Message (IM) interface 1403. IM interface 1403 represents a distinct and concurrent communications session. As shown in interface 1403, the IM sender is able to view a communications session with IM recipient "SurfinDiane."

Figure 15:
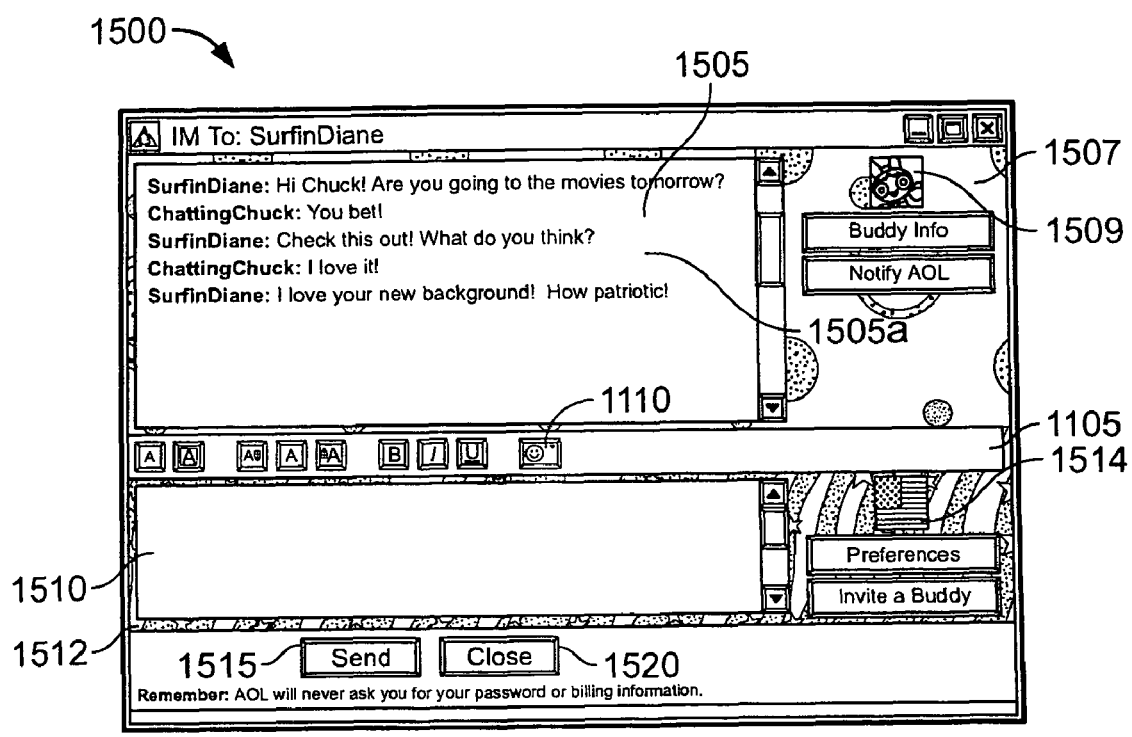

FIG. 15 illustrates one example of an IM UI 1500 that may be presented to an IM sender of an IM service provider such as the AOL Instant Messenger (AIM) service provided by America Online. The UI 1500 is rendered in response to user manipulation of the general interface tab 1420 of FIG. 14. In general, the UI 1500 is rendered on the IM sender system 105 using software stored on the IM sender system 105. One or more personalization items may be provided for the UI.

The UI 1500 includes an IM display area 1505 to display the messages 1505a of an active IM session. In the example of FIG. 15, the active IM session involves a conversation between the IM sender having a screen name of "ChattingChuck" and the IM recipient having a screen name of "SurfinDiane." An IM compose area 1510 may be used to compose a message to send to the IM recipient in the active IM session, typically by clicking on the send control button 1515 in the UI. A control button 1520 may be provided to close the active IM session. Font and appearance controls may be provided on toolbar 1105 to control how the message being entered in the IM compose area 1510 is displayed to the IM recipient and in the IM display area 1505 once the message in the IM compose area 1510 is sent. For example, the IM sender may select control 1110 to choose a personalization item such as an emoticon to be sent in an IM message from the IM sender to the IM recipient. The IM sender system sends an identifier corresponding to the personalization item in the IM message, and the IM recipient system retrieves the corresponding personalization item based on the identifier. If the personalization item is not stored locally at the IM recipient system, the IM recipient system requests the personalization item from another source, such as an IM host.

The UI 1500 includes personalization items 1507 and 1509 from the IM recipient and personalization items 1512 and 1514 from the IM sender. In particular, as shown in FIG. 15, the IM recipient "SurfinDiane" has provided IM wallpaper 1507 and a buddy icon 1509 to the IM sender "ChattingChuck." Typically, the IM wallpaper 1507 and the buddy icon 1509 are transported from the IM recipient to the IM sender by inserting an identifier corresponding to the IM wallpaper 1507 and an identifier corresponding to the buddy icon 1509 into an instant message from the IM recipient to the IM sender. The IM sender system 105 receives the instant message and the identifier, and searches for the corresponding IM wallpaper and buddy icon on the system of the IM sender. If a personalization item is not found on the system of the IM sender, then the system retrieves the personalization item from a different location, such as, for example, an IM host 305. Once retrieved, the IM sender system renders the IM wallpaper 1507 and the buddy icon 1507.

Alternatively, personalization items 1507 and 1509 of the IM recipient may be made available to the IM sender without having to receive an instant message from the IM recipient. The IM sender system 105 selects the identifiers corresponding to the personalization items 1507 and 1509 of the IM recipient. The identifiers may be associated with a screen name or other identifying information of the IM recipient. For example, the identifiers may be associated with the screen name of the IM recipient and stored locally at the IM sender system 105, or the IM sender system may retrieve the identifiers associated with the screen name of the IM recipient from another location such as the IM host system 310 or another remotely-accessible data store such as the IM recipient system 305 or a remote or third-party server.

Also, as discussed above with respect to step 532 of FIG. 5B, the personalization items 1512 and 1514 of the IM sender may be rendered to the IM sender.

The IM sender system 105 uses the identifiers to determine if the corresponding personalization items are available locally at the IM sender system, and if so, the IM sender system retrieves the corresponding personalization items. If the personalization items are not available locally at the IM sender system 105, the IM sender system requests the personalization items from another location such as an IM host system 310 or another remotely-accessible data store such as the IM recipient system 305, or a remote or third-party server. Once the IM sender system 105 locates or receives the personalization items, the IM sender system renders the items on UI 1500 for perception by the IM sender.

Similarly, IM wallpaper 1512 and a buddy icon 1514 chosen by the IM sender may be rendered in UI 1500. These items are typically stored locally on the IM sender system 105, and may be retrieved by the IM sender system 105. If an item is not stored locally, the IM sender system 105 may retrieve the personalization item from a different location such as, for example, an IM host 310. Once retrieved, the IM sender system 305 renders the IM wallpaper 1512 and the buddy icon 1514. When the IM sender sends an instant message to IM recipient "SurfinDiane," personalization items 1512 and 1514 are transported along with the IM by sending an identifier corresponding to IM wallpaper 1512 and an identifier corresponding to buddy icon 1514. As described above with respect to FIGS. 5A, 5B, and 14, the IM recipient system 305 receives the instant message and the identifier, and searches for the corresponding IM wallpaper and buddy icon on the system of the IM recipient. If a personalization item is not found on the system of the IM recipient, then the IM recipient system 305 may retrieve the personalization item from a different location such as, for example, an IM host 305. Once retrieved, the IM recipient system 305 renders the IM wallpaper 1512 and the buddy icon 1514.

Figure 16:
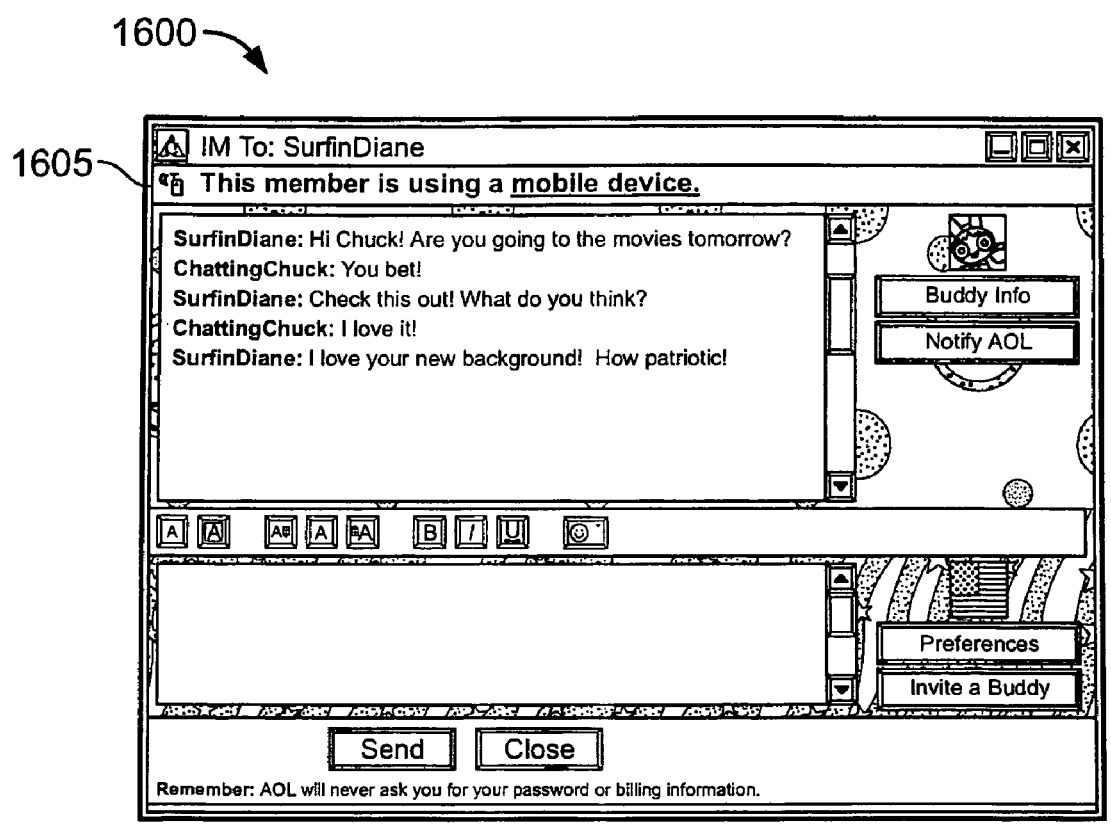

FIG. 16 illustrates an example of an IM UI 1600, and further illustrates the UI discussed above with respect to FIG. 15. In the example of FIG. 16, a further personalization item 1605 is provided by the IM recipient to the IM sender to indicate that the IM recipient is using a mobile device. The personalization item 1605 is transported to the IM sender and rendered by the IM sender as described above with respect to FIGS. 5A, 5B, and 15.

Figure 17:
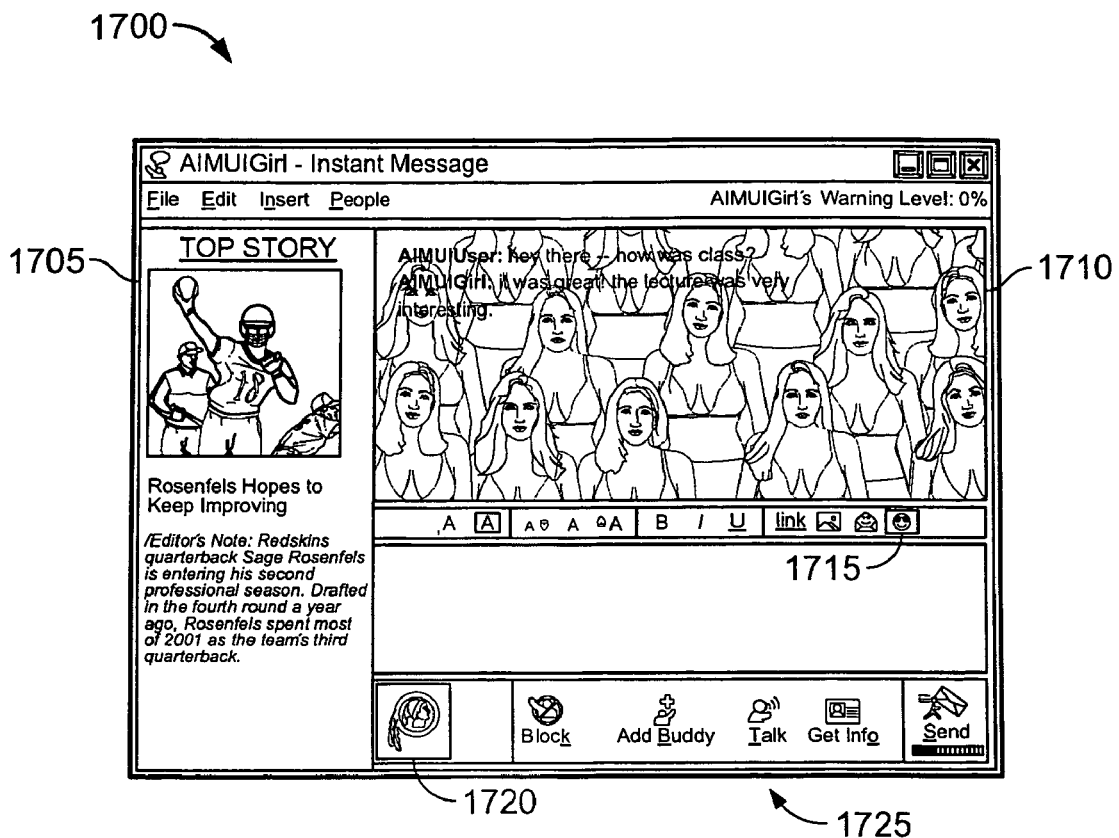

FIG. 17 illustrates yet another example of an IM UI 1700 that may be presented to an IM sender of an IM service provider such as the AOL Instant Messenger (AIM) service provided by America Online. One or more personalization items may be provided for the IM UI. The IM sender may select the personalization items manually, or the personalization items may be selected automatically for the IM sender. The personalization items may be rendered to the IM sender as described above with respect to step 532 of FIG. 5B.

In the example of FIG. 17, an IM recipient "AIMUIGIRL" may provide personalization items 1705, 1710, 1720, and 1725 to the IM sender "AIMMUIUSER" in the manner described above with respect to FIGS. 5A, 5B, and 15. In particular, the IM recipient may provide a sidebar image 1705, a background image 1710, a buddy icon 1720, and a sound 1725 to the IM sender. The sidebar image 1705 may include images and links to content. The background image 1710 may include an image, and typically is a washed out image. The buddy icon 1720 typically is an image. The sound 1725 may be a sound or a sequence of sounds played to the IM sender.

In one implementation, the IM recipient and/or the IM sender may pay a subscription fee to access/use certain personalization items, and the personalization items may be provided by a third party. In another implementation, the personalization items expire and must be replaced after a predetermined event such as a predetermined length of time, passage of a predetermined date, or a predetermined number of uses. Also, a personalization item may be banned if, for example, it is deemed to be offensive, inappropriate, or to otherwise violate a term of service agreement. If it is determined that the personalization item is expired or banned, display of such a personalization item will be disallowed and the user typically will be required to choose a different personalization item.

Other implementations are within the scope of the following claims. For example, one identifier could correspond to a group of personalization items, or a personalization item could have more than one identifier. As a further example, although the examples above are given in an instant message context, other communications systems with similar attributes may be used. For example, personalization items may be used in a chat room or in e-mail communications. Also, the user interface may be a viewable interface, an audible interface, a tactile interface, or any combination of these.

What is claimed is:

1. A computer implemented method for an instant messaging communications session, the method comprising:

receiving, on an instant messaging application user interface of an instant message sender system, a selection of a personalization item by the instant message sender, the personalization item to be associated with the instant message sender;

receiving, on the instant messaging application user interface of the instant message sender system, an input of instant message text from the instant message sender;

obtaining, via the instant message sender system, an identifier associated with the personalization item;

transmitting the instant message text and the identifier to an instant message recipient system;

obtaining, via the instant message recipient system, the personalization item associated with the identifier; and rendering, on an instant messaging application graphical user interface of the instant message recipient system, the personalization item and the instant message text, wherein the graphical user interface includes a graphical window in which the personalization item and instant message text are rendered, the graphical window being configured to enable communications between only two users and configured to be displayed to an instant message recipient in response to receipt of the instant message text and the identifier by the instant message recipient system, the graphical window including:

a first displayed portion associated with the instant message sender, the first displayed portion including:

an instant message display area structured and arranged to display the instant message text and text of other instant messages communicated between the instant message sender and the instant message recipient during the instant messaging communications session, and a first personalization portion positioned adjacent to the instant message display area, the first personalization portion including the personalization item; and a second displayed portion associated with the instant message recipient and displayed below the first displayed portion, the second displayed portion including:

an instant message compose area structured and arranged to receive an input of instant message text by the instant message recipient, and a second personalization portion positioned adjacent to the instant message compose area, the second personalization portion having a visual appearance personalized to the instant message recipient based on an identifier selected by the instant message recipient.

2. The method of claim 1 in which obtaining the identifier comprises:

storing one or more identifiers associated with one or more personalization items for one or more instant message users at an instant message host system;

receiving an identity of the individual instant message sender at the instant message host system; and accessing the identifier associated with the individual instant message user.

3. The method of claim 1 in which obtaining the identifier comprises locating the identifier on the instant message sender system.

4. The method of claim 1 in which obtaining the identifier comprises retrieving the identifier from a remote data store.

5. The method of claim 1 in which obtaining the personalization item comprises:

determining whether the personalization item associated with the received identifier is available at the instant message recipient system;

retrieving the personalization item from the instant message recipient system if the personalization item is available at the instant message recipient system; and requesting the personalization item from a remote source and receiving the personalization item from the remote source at the instant message recipient system if the personalization item is not available at the instant message recipient system.

6. The method of claim 5 in which requesting the personalization item further comprises identifying the remote source.

7. The method of claim 5 in which requesting the personalization item comprises requesting the personalization item from an instant messaging host.

8. The method of claim 5 in which requesting the personalization item comprises requesting the personalization item from a third-party server.

9. The method of claim 8 in which requesting the personalization item from a third-party server comprises requesting the personalization item from a server authorized as a partner to an instant messaging host.

10. The method of claim 5 in which requesting the personalization item from a remote source comprises requesting the personalization item from the instant message sender system.

11. The method of claim 1 in which obtaining the identifier comprises receiving the identifier upon a change in a presence state of the individual instant message sender.

12. The method of claim 1 in which obtaining the personalization item comprises obtaining a graphic.

13. The method of claim 12 in which the graphic comprises an icon.

14. The method of claim 1 in which obtaining the personalization item comprises obtaining wallpaper capable of being rendered on the instant messaging application user interface of the instant message recipient system.

15. The method of claim 1 in which obtaining the personalization item comprises obtaining an animation sequence.

16. The method of claim 1 in which obtaining the personalization item comprises obtaining a video segment.

17. The method of claim 1 in which obtaining the personalization item comprises obtaining a customized binary object provided by the instant message sender.

18. The method of claim 17 in which obtaining the customized binary object comprises obtaining a customized binary object uploaded by the instant message sender to a server.

19. The method of claim 1 in which obtaining the personalization item comprises obtaining a personalization item provided by a third party.

20. The method of claim 19 in which obtaining the personalization item comprises obtaining a personalization item enabled to be rendered in consideration of a payment.

21. The method of claim 1 in which obtaining the personalization item comprises obtaining a personalization item configured to expire upon the occurrence of a predetermined event.

22. The method of claim 21 in which the predetermined event comprises passage of a predetermined length of time.

23. The method of claim 22 in which the predetermined event comprises passage of a predetermined date.

24. The method of claim 22 in which the predetermined event comprises a predetermined number of uses.

25. The method of claim 22 further comprising:
determining whether the personalization item has expired, and disallowing display of the personalization item if the personalization item has expired.

26. The method of claim 1 in which obtaining the identifier further comprises obtaining an identifier comprising a location of the personalization item.

27. The method of claim 26 in which the identifier further comprises an item type and a data size.

28. The method of claim 26 wherein the identifier further comprises a flag.

29. The method of claim 28 wherein the flag further comprises one or more of a custom item flag, an official item flag, a banned item flag, and a redirect to different item flag.

30. The method of claim 1 further comprising:
determining whether the personalization item has been banned, and disallowing display of the personalization item if the personalization item has been banned.

31. The method of claim 1 further comprising updating the personalization item.

32. The method of claim 1 further comprising comparing an actual format of the personalization item to an expected format based upon the identifier.

33. The method of claim 1 wherein the personalization item is obtained and rendered irrespective of a state of the instant message sender and in response to obtaining the identifier.

34. The method of claim 1, wherein transmitting the instant messaging text and the identifier comprises transmitting both the instant message text and the identifier in a single instant message.

35. The method of claim 1, wherein transmitting the instant message text and the identifier comprises transmitting the identifier in a first instant messaging communication and transmitting the instant message text in a second instant messaging communication.

36. The method of claim 1, wherein the instant message text and the identifier are transmitted to the instant message recipient system as part of the first instant message communicated to the instant message recipient by the instant message sender after the instant message sender connects to an instant messaging host system.

37. The method of claim 1, wherein the first displayed portion and the second displayed portion are rectangular in dimensions.

38. The method of claim 37, wherein the first displayed portion comprises approximately a top half of the graphical window and the second displayed portion comprises approximately a bottom half of the graphical window.

39. The method of claim 1, wherein the first personalization portion comprises a first border at least partially surrounding the instant message display area.

40. The method of claim 39, wherein the first border comprises a margin that completely surrounds the instant message display area.

41. The method of claim 40, wherein the first border including the personalization item includes the first border displaying a wallpaper selected by the instant message sender that covers the first border in its entirety.

42. The method of claim 1, wherein the first personalization portion comprises an icon, animation, or video positioned to the right of the instant message display area.

43. The method of claim 1, wherein the second personalization portion comprises a second border at least partially surrounding the instant message compose area.

44. The method of claim 43, wherein the second border comprises a margin that completely surrounds the instant message compose area.

45. The method of claim 44, wherein the second border having a visual appearance personalized to the instant message recipient includes the second border displaying wallpaper identified based on the identifier selected by the instant message recipient, the wallpaper covering the second border in its entirety.

46. The method of claim 1, wherein the second personalization portion comprises an icon, animation, or video positioned to the right of the instant message display area, the icon, animation, or video being selected based on the identifier selected by the instant message recipient.

47. A computer program, stored on a computer readable medium, the computer program comprising:
means for receiving, on an instant messaging application user interface of an instant message sender system, a selection of a personalization item by an instant message sender, the personalization item to be associated with the instant message sender;
means for receiving, on the instant messaging application user interface of the instant message sender system, an input of instant message text from the instant message sender;
means for obtaining, via the instant message sender system, an identifier associated with the personalization item;
means for transmitting the instant message text and the identifier to an instant message recipient system;
means for obtaining, via the instant message recipient system, the personalization item associated with the identifier; and
means for rendering, on an instant messaging application graphical user interface of the instant message recipient system, the personalization item and the instant message text,
wherein the graphical user interface includes a graphical window in which the personalization item and instant message text are rendered, the graphical window being configured to enable communications between only two users and configured to be displayed to an instant message recipient in response to receipt of the instant message text and the identifier by the instant message recipient system, the graphical window including:
a first displayed portion associated with the instant message sender, the first displayed portion including:
an instant message display area structured and arranged to display the instant message text and text of other instant messages communicated between the instant message sender and the instant message recipient during the instant messaging communications session, and
a first personalization portion positioned adjacent to the instant message display area, the first personalization portion including the personalization item; and
a second displayed portion associated with the instant message recipient and displayed below the first displayed portion, the second displayed portion including:
an instant message compose area structured and arranged to receive an input of instant message text by the instant message recipient, and
a second personalization portion positioned adjacent to the instant message compose area, the second personalization portion having a visual appearance personalized to the instant message recipient based on an identifier selected by the instant message recipient.

48. The computer program of claim 47, wherein the means for transmitting the instant messaging text and the identifier comprises means for transmitting both the instant message text and the identifier in a single instant message.

49. The computer program of claim 47, wherein the means for transmitting the instant message text and the identifier comprises means for transmitting the identifier in a first instant messaging communication and means for transmitting the instant message text in a second instant messaging communication.

50. The computer program of claim 47, wherein the instant message text and the identifier are transmitted to the instant message recipient system as part of a first instant message communicated to the instant message recipient by the instant message sender after the instant message sender connects to an instant messaging host system.

51. A computer implemented method for an instant messaging communications session, the method comprising:
  obtaining, on an instant messaging application user interface of an instant message sender system, a selection of a personalization item to be associated with an instant message sender;
  receiving, on the instant message sender system, an input of instant message text from the instant message sender, the instant message text having content that is independent of the selection of a personalization item;
  transmitting the instant message text and an identifier associated with the personalization item to an instant message recipient system;
  rendering, on an instant messaging application graphical user interface of the instant message recipient system, the personalization item and the instant message text; and
  repeating the receiving, transmitting, and rendering steps, while maintaining the selection of the personalization item,
  wherein the graphical user interface includes a graphical window in which the personalization item and instant message text are rendered, the graphical window being configured to enable communications between only two users and configured to be displayed to an instant message recipient in response to receipt of the instant message text and the identifier by the instant message recipient system, the graphical window including:
    a first displayed portion associated with the instant message sender, the first displayed portion including:
      an instant message display area structured and arranged to display the instant message text and text of other instant messages communicated between the instant message sender and the instant message recipient during the instant messaging communications session, and
      a first personalization portion positioned adjacent to the instant message display area, the first personalization portion including the personalization item; and
    a second displayed portion associated with the instant message recipient and displayed below the first displayed portion, the second displayed portion including:
      an instant message compose area structured and arranged to receive an input of instant message text by the instant message recipient, and
      a second personalization portion positioned adjacent to the instant message compose area, the second personalization portion having a visual appearance personalized to the instant message recipient based on an identifier selected by the instant message recipient.

52. The method of claim 51, wherein transmitting the instant messaging text and the identifier comprises transmitting both the instant message text and the identifier in a single instant message.

53. The method of claim 51, wherein transmitting the instant message text and the identifier comprises transmitting the identifier in a first instant messaging communication and transmitting the instant message text in a second instant messaging communication.

54. The method of claim 51, wherein the instant message text and the identifier are transmitted to the instant message recipient system as part of the first instant message communicated to the instant message recipient by the instant message sender after the instant message sender connects to an instant messaging host system.

55. A computer program, stored on a computer readable medium, the computer program comprising:
  means for obtaining, on an instant messaging application user interface of an instant message sender system, a selection of a personalization item to be associated with an instant message sender;
  means for receiving, on the instant message sender system, an input of instant message text from the instant message sender, the instant message text having content that is independent of the selection of a personalization item;
  means for transmitting the instant message text and an identifier associated with the personalization item to an instant message recipient system;
  means for rendering, on an instant messaging application graphical user interface of the instant message recipient system, the personalization item and the instant message text; and
  means for actuating the receiving means, the transmitting means, and the rendering means, while maintaining the selection of the personalization item,
  wherein the graphical user interface includes a graphical window in which the personalization item and instant message text are rendered, the graphical window being configured to enable communications between only two users and configured to be displayed to an instant message recipient in response to receipt of the instant message text and the identifier by the instant message recipient system, the graphical window including:
    a first displayed portion associated with the instant message sender, the first displayed portion including:
      an instant message display area structured and arranged to display the instant message text and text of other instant messages communicated between the instant message sender and the instant message recipient during the instant messaging communications session, and
      a first personalization portion positioned adjacent to the instant message display area, the first personalization portion including the personalization item; and
    a second displayed portion associated with the instant message recipient and displayed below the first displayed portion, the second displayed portion including:
      an instant message compose area structured and arranged to receive an input of instant message text by the instant message recipient, and
      a second personalization portion positioned adjacent to the instant message compose area, the second personalization portion having a visual appearance personalized to the instant message recipient based on an identifier selected by the instant message recipient.

56. The computer program of claim 55, wherein the means for transmitting the instant messaging text and the identifier comprises means for transmitting both the instant message text and the identifier in a single instant message.

57. The computer program of claim 55, wherein the means for transmitting the instant message text and the identifier comprises means for transmitting the identifier in a first instant messaging communication and means for transmitting the instant message text in a second instant messaging communication.

58. The computer program of claim 55, wherein the instant message text and the identifier are transmitted to the instant message recipient system as part of a first instant message communicated to the instant message recipient by the instant message sender after the instant message sender connects to an instant messaging host system.

59. A graphical user interface configured to display an instant messaging session between a first user and a second user, the graphical user interface comprising:
  a graphical window configured to enable communications between only two users and configured to be displayed in response to receipt of an instant message communicated between the first user and the second user, the graphical window including:
    a first displayed portion associated with the first user, the first displayed portion having:
      an instant message display area structured and arranged to display instant messages communicated between the first user and the second user during the instant messaging session, and
      a first personalization portion positioned adjacent to the instant message display area, the first personalization portion having a visual appearance personalized to the first user based on an identifier selected by the first user; and
    a second displayed portion associated with the second user and displayed below the first displayed portion, the second displayed portion having:
      an instant message compose area structured and arranged to receive an input of instant message text, and
      a second personalization portion positioned adjacent to the instant message compose area, the second personalization portion having a visual appearance personalized to the second user based on an identifier selected by the second user.

60. The graphical user interface of claim 59, wherein the input of instant message text is from the second user.

61. The graphical user interface of claim 59, wherein the first personalization portion has a visual appearance personalized to the first user based on an identifier received with instant message text in an instant message received by the second user from the first user.

62. The graphical user interface of claim 61, wherein the instant message is the first instant message communicated to the second user by the first user after the first user connects to an instant messaging host system.

63. The graphical user interface of claim 59, wherein the first displayed portion and the second displayed portion are rectangular in dimensions.

64. The graphical user interface of claim 63, wherein the first displayed portion comprises approximately a top half of the graphical window and the second displayed portion comprises approximately a bottom half of the graphical window.

65. The graphical user interface of claim 59, wherein the first personalization portion comprises a first border at least partially surrounding the instant message display area.

66. The graphical user interface of claim 65, wherein the first border comprises a margin that completely surrounds the instant message display area.

67. The graphical user interface of claim 66, wherein the first border having a visual appearance personalized to the instant message sender includes the first border displaying a wallpaper selected by the instant message sender that covers the first border in its entirety.

68. The graphical user interface of claim 59, wherein the first personalization portion comprises an icon, animation, or video positioned to the right of the instant message display area, the icon, animation, or video being selected based on the identifier selected by the instant message sender.

69. The graphical user interface of claim 59, wherein the second personalization portion comprises a second border at least partially surrounding the instant message compose area.

70. The graphical user interface of claim 69, wherein the second border comprises a margin that completely surrounds the instant message compose area.

71. The graphical user interface of claim 70, wherein the second border having a visual appearance personalized to the instant message recipient includes the second border displaying wallpaper identified based on the identifier selected by the instant message recipient, the wallpaper covering the second border in its entirety.

72. The method of claim 59, wherein the second personalization portion comprises an icon, animation, or video positioned to the right of the instant message display area, the icon, animation, or video being selected based on the identifier selected by the instant message recipient.

* * * * *